United States Patent
Balagurunathan et al.

(10) Patent No.: US 11,586,344 B1
(45) Date of Patent: Feb. 21, 2023

(54) SYNCHRONIZING MEDIA CONTENT STREAMS FOR LIVE BROADCASTS AND LISTENER INTERACTIVITY

(71) Applicant: Amazon Technologies, Inc., Seattle, WA (US)

(72) Inventors: Ramasubramanian Balagurunathan, Redmond, WA (US); Thomas Albert Faulhaber, Seattle, WA (US); Pratik GuhaRay, Kenmore, WA (US); Sanjeev Kumar, Redmond, WA (US); Ayman Mahfouz, Culver City, CA (US); Deepak Maini, Seattle, WA (US); Matthew David Sandler, Seal Beach, CA (US); Harshal Dilip Wanjari, Issaquah, WA (US); Ankit Kumar Yadav, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/341,061

(22) Filed: Jun. 7, 2021

(51) Int. Cl.
*G06F 3/048* (2013.01)
*G06F 3/04847* (2022.01)
(Continued)

(52) U.S. Cl.
CPC .......... *G06F 3/04847* (2013.01); *G06F 3/165* (2013.01); *H04L 65/60* (2013.01); *H04L 65/611* (2022.05); *H04L 67/1095* (2013.01)

(58) Field of Classification Search
None
See application file for complete search history.

(56) References Cited

U.S. PATENT DOCUMENTS

| 8,023,800 B2* | 9/2011 | Concotelli ........... G11B 27/034 386/296 |
| 8,560,683 B2 | 10/2013 | Funk et al. |

(Continued)

FOREIGN PATENT DOCUMENTS

| AU | 2013204532 B2 | 11/2014 |
| CA | 2977959 A1 | 9/2016 |

(Continued)

OTHER PUBLICATIONS

Tengeh, R. K., & Udoakpan, N. (2021). Over-the-Top Television Services and Changes in Consumer Viewing Patterns in South Africa. Management Dynamics in the Knowledge Economy. 9(2), 257-277 DOI 10.2478/mdke-2021-0018 ISSN: 2392-8042 (online) www.managementdynamics.ro; URL: https://content.sciendo.com/view/journals/mdke/mdke-overview.xml.

(Continued)

*Primary Examiner* — Tuan S Nguyen
(74) *Attorney, Agent, or Firm* — Athorus, PLLC

(57) ABSTRACT

A creator establishes a media program including a plurality of media files or content in accordance with a broadcast plan. Mixing systems establish connections with a mobile device of the creator, and with sources of the audio files or content, either manually or automatically in response to instructions of the creator. Broadcast systems establish connections with computer devices of listeners and a mixing system. Conference systems establish connections with the mobile device of the creator and a mixing system. The connections established may be one-way or two-way channels. The media program may include live or previously recorded audio content including words or sounds of the creator, as well as advertisements, music, news, sports, weather, or other programming. The media program may also include live or previously recorded interviews or other (Continued)

conversations with guests, including but not limited to one or more listeners.

20 Claims, 19 Drawing Sheets

(51) Int. Cl.
*G06F 3/16* (2006.01)
*H04L 67/1095* (2022.01)
*H04L 65/60* (2022.01)
*H04L 65/611* (2022.01)

(56) References Cited

U.S. PATENT DOCUMENTS

| | | | |
|---|---|---|---|
| 8,572,243 | B2 | 10/2013 | Funk et al. |
| 8,768,782 | B1 | 7/2014 | Myslinski |
| 9,003,032 | B2 | 4/2015 | Funk et al. |
| 9,369,740 | B1 | 6/2016 | Funk et al. |
| 9,706,253 | B1 | 7/2017 | Funk et al. |
| 9,729,596 | B2 | 8/2017 | Sanghavi et al. |
| 9,781,491 | B2 | 10/2017 | Wilson |
| 9,872,069 | B1 | 1/2018 | Funk et al. |
| 10,091,547 | B2 | 10/2018 | Sheppard et al. |
| 10,110,952 | B1 | 10/2018 | Gupta et al. |
| 10,135,887 | B1 | 11/2018 | Esser et al. |
| 10,140,364 | B1 | 11/2018 | Diamondstein |
| 10,178,442 | B2 | 1/2019 | Shkedi |
| 10,313,726 | B2 | 6/2019 | Woods et al. |
| 10,356,476 | B2 | 7/2019 | Dharmaji |
| 10,432,335 | B2 | 10/2019 | Bretherton |
| 10,489,395 | B2 | 11/2019 | Lakkur et al. |
| 10,685,050 | B2 | 6/2020 | Krishna et al. |
| 10,698,906 | B2 | 6/2020 | Hargreaves et al. |
| 10,719,837 | B2 | 7/2020 | Kolowich et al. |
| 10,769,678 | B2 | 9/2020 | Li |
| 10,846,330 | B2 | 11/2020 | Shilo |
| 10,985,853 | B2 | 4/2021 | Bretherton |
| 10,986,064 | B2 | 4/2021 | Siegel et al. |
| 10,997,240 | B1 | 5/2021 | Aschner et al. |
| 11,451,863 | B1 | 9/2022 | Benjamin et al. |
| 2002/0042920 | A1 | 4/2002 | Thomas et al. |
| 2002/0056087 | A1 | 5/2002 | Berezowski et al. |
| 2006/0268667 | A1* | 11/2006 | Jellison ............ G06F 16/116 707/E17.031 |
| 2007/0124756 | A1 | 5/2007 | Covell et al. |
| 2007/0271518 | A1 | 11/2007 | Tischer et al. |
| 2007/0271580 | A1 | 11/2007 | Tischer et al. |
| 2008/0086742 | A1 | 4/2008 | Aldrey et al. |
| 2009/0044217 | A1 | 2/2009 | Lutterbach et al. |
| 2009/0076917 | A1 | 3/2009 | Jablokov et al. |
| 2010/0088187 | A1 | 4/2010 | Courtney et al. |
| 2011/0067044 | A1 | 3/2011 | Albo |
| 2012/0191774 | A1 | 7/2012 | Bhaskaran et al. |
| 2012/0304206 | A1 | 11/2012 | Roberts et al. |
| 2012/0311618 | A1 | 12/2012 | Blaxland |
| 2012/0331168 | A1* | 12/2012 | Chen ............... H04N 21/439 709/231 |
| 2013/0074109 | A1 | 3/2013 | Skelton et al. |
| 2013/0247081 | A1 | 9/2013 | Vinson et al. |
| 2014/0019225 | A1 | 1/2014 | Guminy et al. |
| 2014/0040494 | A1 | 2/2014 | Deinhard et al. |
| 2014/0068432 | A1 | 3/2014 | Kucharz et al. |
| 2014/0108531 | A1 | 4/2014 | Klau |
| 2014/0123191 | A1 | 5/2014 | Hahn et al. |
| 2014/0228010 | A1 | 8/2014 | Barbulescu et al. |
| 2014/0325557 | A1 | 10/2014 | Evans et al. |
| 2014/0372179 | A1 | 12/2014 | Ju et al. |
| 2015/0163184 | A1 | 6/2015 | Kanter et al. |
| 2015/0248798 | A1 | 9/2015 | Howe et al. |
| 2015/0289021 | A1 | 10/2015 | Miles |
| 2015/0319472 | A1 | 11/2015 | Kotecha et al. |
| 2016/0188728 | A1 | 6/2016 | Gill et al. |
| 2016/0266781 | A1 | 9/2016 | Dandu et al. |
| 2016/0330529 | A1 | 11/2016 | Byers |
| 2017/0127136 | A1 | 5/2017 | Roberts et al. |
| 2017/0289617 | A1 | 10/2017 | Song et al. |
| 2018/0025078 | A1 | 1/2018 | Quennesson |
| 2018/0035142 | A1 | 2/2018 | Rao et al. |
| 2018/0205797 | A1 | 7/2018 | Faulkner |
| 2018/0255114 | A1 | 9/2018 | Dharmaji |
| 2018/0322411 | A1 | 11/2018 | Wang et al. |
| 2019/0065610 | A1 | 2/2019 | Singh |
| 2019/0132636 | A1 | 5/2019 | Gupta et al. |
| 2019/0171762 | A1 | 6/2019 | Luke et al. |
| 2019/0327103 | A1 | 10/2019 | Niekrasz |
| 2019/0385600 | A1 | 12/2019 | Kim |
| 2021/0104245 | A1 | 4/2021 | Alas et al. |
| 2021/0105149 | A1 | 4/2021 | Roedel et al. |
| 2021/0210102 | A1 | 7/2021 | Huh et al. |
| 2021/0232577 | A1 | 7/2021 | Ogawa et al. |
| 2021/0256086 | A1 | 8/2021 | Askarian et al. |
| 2021/0366462 | A1 | 11/2021 | Yang et al. |
| 2022/0038783 | A1 | 2/2022 | Wee |
| 2022/0223286 | A1 | 7/2022 | Lach et al. |
| 2022/0254348 | A1 | 8/2022 | Tay et al. |

FOREIGN PATENT DOCUMENTS

| | | |
|---|---|---|
| CN | 104813305 A | 7/2015 |
| KR | 20170079496 A | 7/2017 |
| WO | 2019089028 A1 | 5/2019 |

OTHER PUBLICATIONS

Github, "Spotify iOS SDK," GitHub.com, GitHub Inc. and GitHub B.V., Feb. 17, 2021, available at URL: https://github.com/spotify/ios-sdk#how-do-app-remote-calls-work, 10 pages.

Stack Overflow, "Audio mixing of Spotify tracks in IOS app," stackoverflow.com, Stack Overflow Network, Jul. 2012, available at URL: https://stackoverflow.com/questions/11396348/audio-mixing-of-spotify-tracks-in-ios-app, 2 pages.

Arora, S. et al., "A Practical Algorithm for Topic Modeling with Provable Guarantees," Proceedings in the 30th International Conference on Machine Learning, JMLR: W&CP vol. 28, published 2013 (Year: 2013), 9 pages.

* cited by examiner

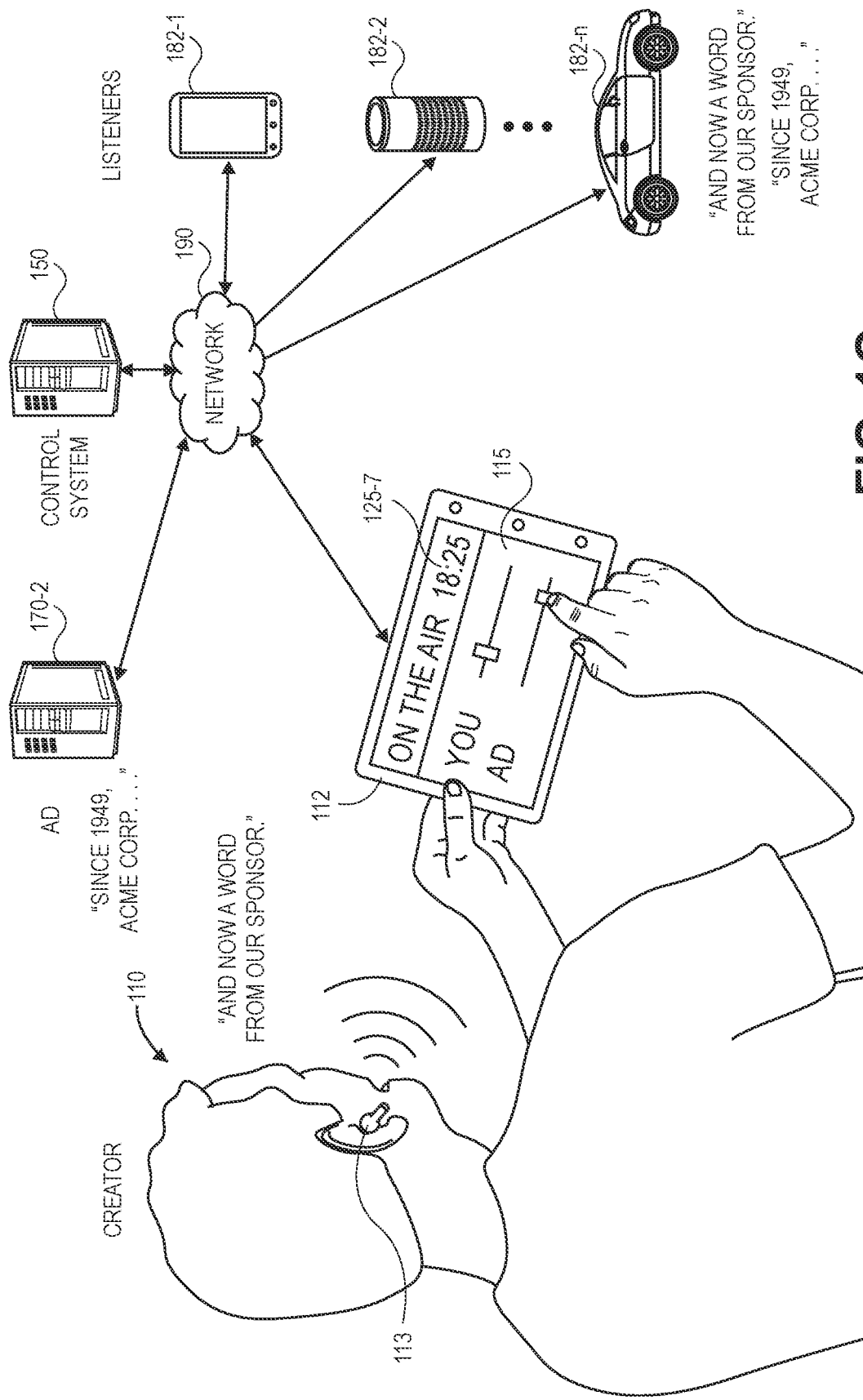

SYNCHRONIZING MEDIA CONTENT STREAMS FOR LIVE BROADCASTS AND LISTENER INTERACTIVITY

BACKGROUND

Commercial radio began to evolve as an industry in the United States over a century ago. On Aug. 31, 1920, the first news radio program is believed to have been broadcast from the offices of the Detroit News, and later that year, the first entertainment program and the first sporting event are believed to have been aired by a radio station operated by Wendell King, an engineering student at Union College in Schenectady, N.Y. The number of radio stations in the United States grew rapidly thereafter, from a total of five amplitude modulation (or "AM") radio stations in 1921 to approximately eight hundred fifty AM radio stations in 1940, over nine thousand AM or frequency modulation (or "FM") radio stations in 1980, and over fifteen thousand AM or FM radio stations in 2020. Today, it is estimated that approximately two hundred seventy million Americans listen to the radio every week.

Traditionally, operating a radio station (e.g., a terrestrial radio station, or a satellite radio station) has required substantial investments in physical infrastructure and human talent. For example, a terrestrial radio station requires a radio antenna, the largest of which in the United States is nearly two thousand feet tall, while a satellite radio station naturally requires the use of an orbiting satellite. Moreover, radio stations commonly operate from buildings having dedicated rooms with microphones, cameras or other capture devices, as well as consoles including one or more fades, sliders or switches for controlling audio signals (e.g., advertisements, music, news, sports, weather, or other programming) that are transmitted to listeners, playback devices for generating the audio signals, rooms having large racks of servers or other computer systems, and transmission lines extending between such buildings and one or more antennas. Furthermore, in addition to hosts, radio stations typically employ dozens of other personnel, including sound engineers, maintenance engineers, production directors, or station managers, as well as producers of advertisements, music, news, sports, weather, or other programming.

The personnel and systems that are required in order to operate radio stations are large in number and complexity, and may limit radio's potential reach and economic value as a communications medium. Moreover, because such structures and systems are often difficult or expensive to relocate, most radio broadcasts are conducted from in-studio locations, and not from locations where content may be uniquely generated or from locations where content may be particularly pertinent.

BRIEF DESCRIPTION OF THE DRAWINGS

FIGS. 1A through 1H are views of aspects of one system for synchronizing media content streams in accordance with embodiments of the present disclosure.

DETAILED DESCRIPTION

Figure 1A:
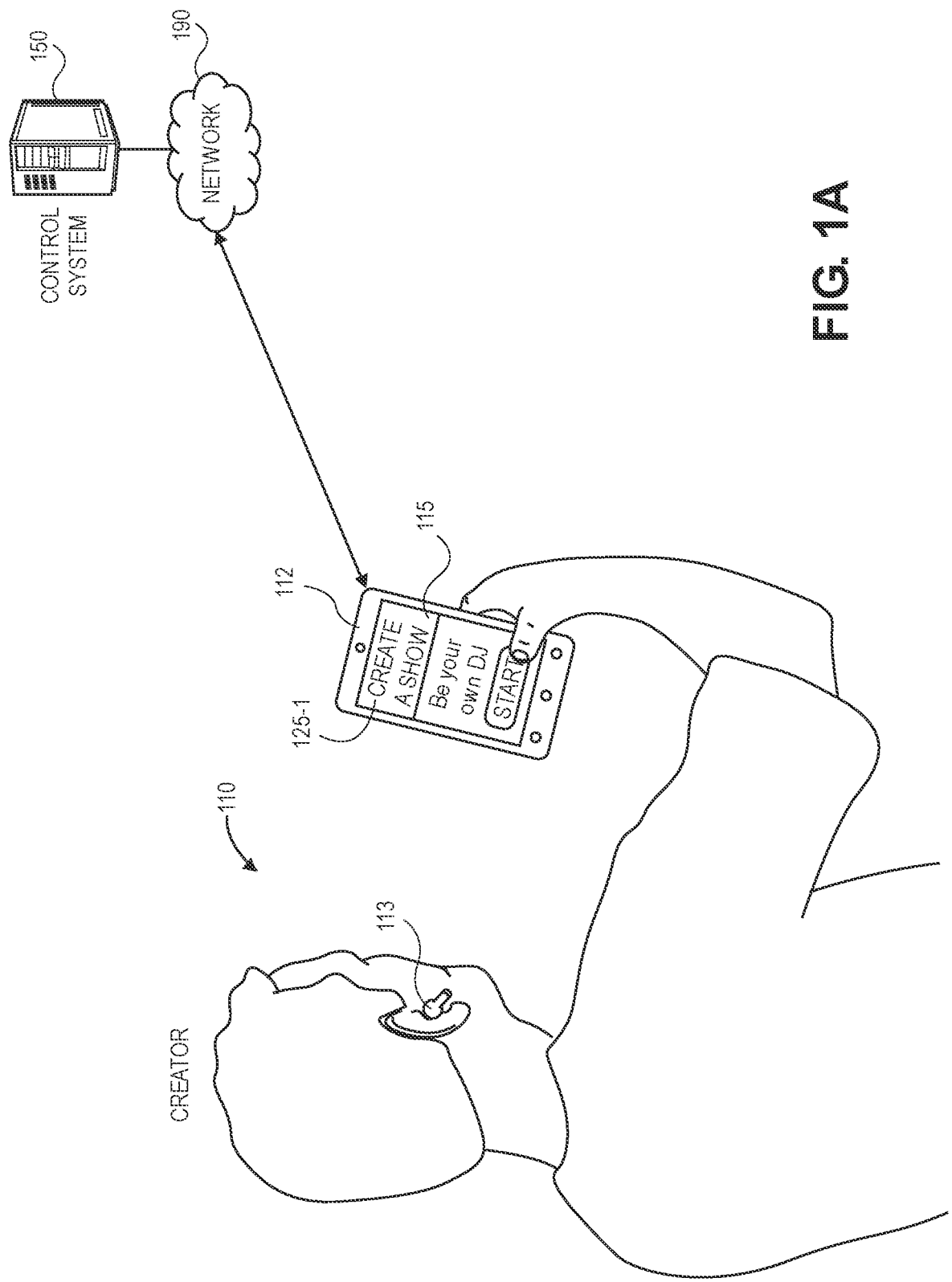

As is set forth in greater detail below, the present disclosure is directed to systems and methods for synchronizing streams of media content, such as for broadcast to systems or devices of one or more users, e.g., listeners or subscribers to a media program. More specifically, the systems and methods of the present disclosure are directed to enabling users of computer devices, or "creators," to construct media programs of their own design that are similar to traditional radio programs, and to transmit data for presenting the media programs to systems or devices of listeners or subscribers over one or more networks. In some implementations, one or more control systems, which may be or include conference systems, broadcast systems, or mixing systems, or other systems, may establish one-way or two-way communications connections between two or more computer systems or devices either automatically or in response to one or more instructions received from one or more creators. Control systems of the present disclosure may synthesize, mix or otherwise combine streams of media (e.g., audio content or video content that may be generated live or previously recorded and retrieved from one or more data stores) of any type that is obtained from any source, and transmit data for playing a stream of media content from a single source, or a combined stream of media content from two or more sources, to any number of systems or devices of listeners. The media programs of the present disclosure may be constructed and transmitted (e.g., broadcast or aired) at the control or discretion of creators, who may provide instructions or commands by way of executions of one or more interactions with user interfaces presented to the creators on a display (e.g., a touchscreen display) or in any other manner.

The systems and methods of the present disclosure provide a number of advantages over existing systems for transmitting media to the masses over existing systems, including but not limited to terrestrial, satellite-based or Internet-based communication systems. The systems and methods of the present disclosure effectively balance interactivity with scale and enable the mixing of media content with minimal latency while ensuring that the mixed media content may be delivered at scale to hundreds, thousands or even millions of listeners. One or more of the control systems described herein, e.g., mixing systems or conference systems, may optimize latency levels while ensuring that creators have the control or discretion to create and manage their own media programs, and to enable interactivity between creators or other guests, hosts or participants in the media programs. One or more of the control systems described herein, e.g., mixing systems or broadcast systems, may be optimized for large-scale delivery and distribution of media content to dozens, hundreds, thousands or any other number of devices of listeners, while providing a seamless media experience to such listeners.

Accordingly, by establishing connections between computer systems or devices, in response to instructions received from the creator or in accordance with a broadcast plan (or a sequence of media content, or another schedule), e.g., in one or more back-end processes, the systems and methods of the present disclosure enable any user of any computer device to be a creator of his or her own media program featuring media content of his or her choosing, and to present the media program to listeners in any location, without a need for the substantial investments in infrastructure or personnel that have been traditionally required by radio stations. The systems and methods of the present disclosure thereby enable media programs to be conceived by creators and presented to listeners rapidly and effectively, and to cover any topic from any location.

Referring to FIGS. 1A through 1H, views of aspects of one system for synchronizing media content streams in accordance with embodiments of the present disclosure are shown. As is shown in FIG. 1A, a mobile device 112 (e.g., a smartphone, a tablet computer, a laptop computer, or any other system or device) of a creator 110 (e.g., a user) and a control system 150 (e.g., one or more servers or other computer systems) are connected to one another over one or more networks 190, which may include the Internet in whole or in part. The creator 110 wears one or more ear buds 113 (or earphones, or headphones) or other communication systems or devices which may be in communication with the mobile device 112, and may exchange (e.g., transfer or receive data) relating to audio signals or any other data with the mobile device 112.

As is shown in FIG. 1A, the mobile device 112 includes a display 115 (e.g., a touchscreen) having a user interface 125-1 rendered thereon. The user interface 125-1 may include one or more interactive or selectable elements or features enabling the creator 110 to indicate his or her intent or interest in constructing a media program, or any other elements or features. In some implementations, the display 115 may be a capacitive touchscreen, a resistive touchscreen, or any other system for receiving interactions by the creator 110. Alternatively, or additionally, the creator 110 may interact with the user interface 125-1 or the mobile device 112 in any other manner, such as by way of any input/output ("I/O") devices, including but not limited to a mouse, a stylus, a touchscreen, a keyboard, a trackball, or a trackpad, as well as any voice-controlled devices or software (e.g., a personal assistant), which may capture and interpret voice commands using one or more microphones or acoustic sensors provided on the mobile device 112, the ear buds 113, or any other systems (not shown). In accordance with implementations of the present disclosure, the user interface 125-1, or other user interfaces, may include any number of buttons, text boxes, checkboxes, drop-down menus, list boxes, toggles, pickers, search fields, tags, sliders, icons, carousels, or any other interactive or selectable elements or features, for receiving information or data of any type or form.

Figure 1B:
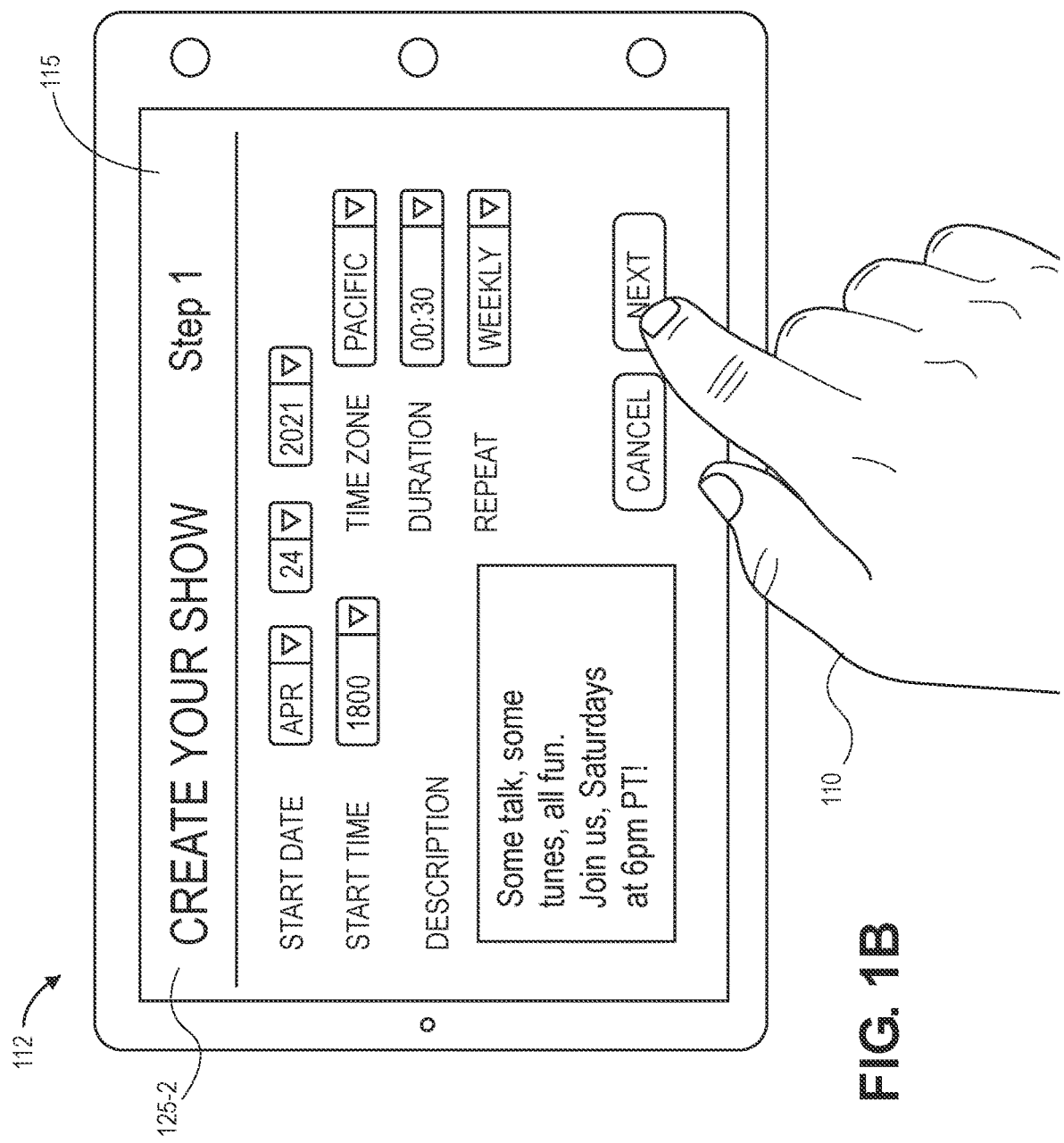

As is shown in FIG. 1B, a user interface 125-2 is rendered on the display 115 of the mobile device 112. The user interface 125-2 includes one or more interactive or selectable features that, when activated by the creator 110, enable the creator 110 to define one or more attributes or parameters of a media program. For example, as is shown in FIG. 1B, the creator 110 may interact with one or more drop-down menus on the user interface 125-2 to designate a start date (viz., Apr. 24, 2021) and a start time (viz., 18:00, or six o'clock p.m.) of the media program, as well as a time zone (viz., Pacific) in which the start time is to be determined. The creator 110 may further interact with one or more drop-down menus on the user interface 125-2 to designate a duration of the media program (viz., thirty minutes) and a period by which the program is to be repeated (viz., weekly). The creator 110 may also enter a text-based description of the media program, or select one or more buttons or other features for confirming its designations or entries and advancing to another user interface.

Figure 1C:
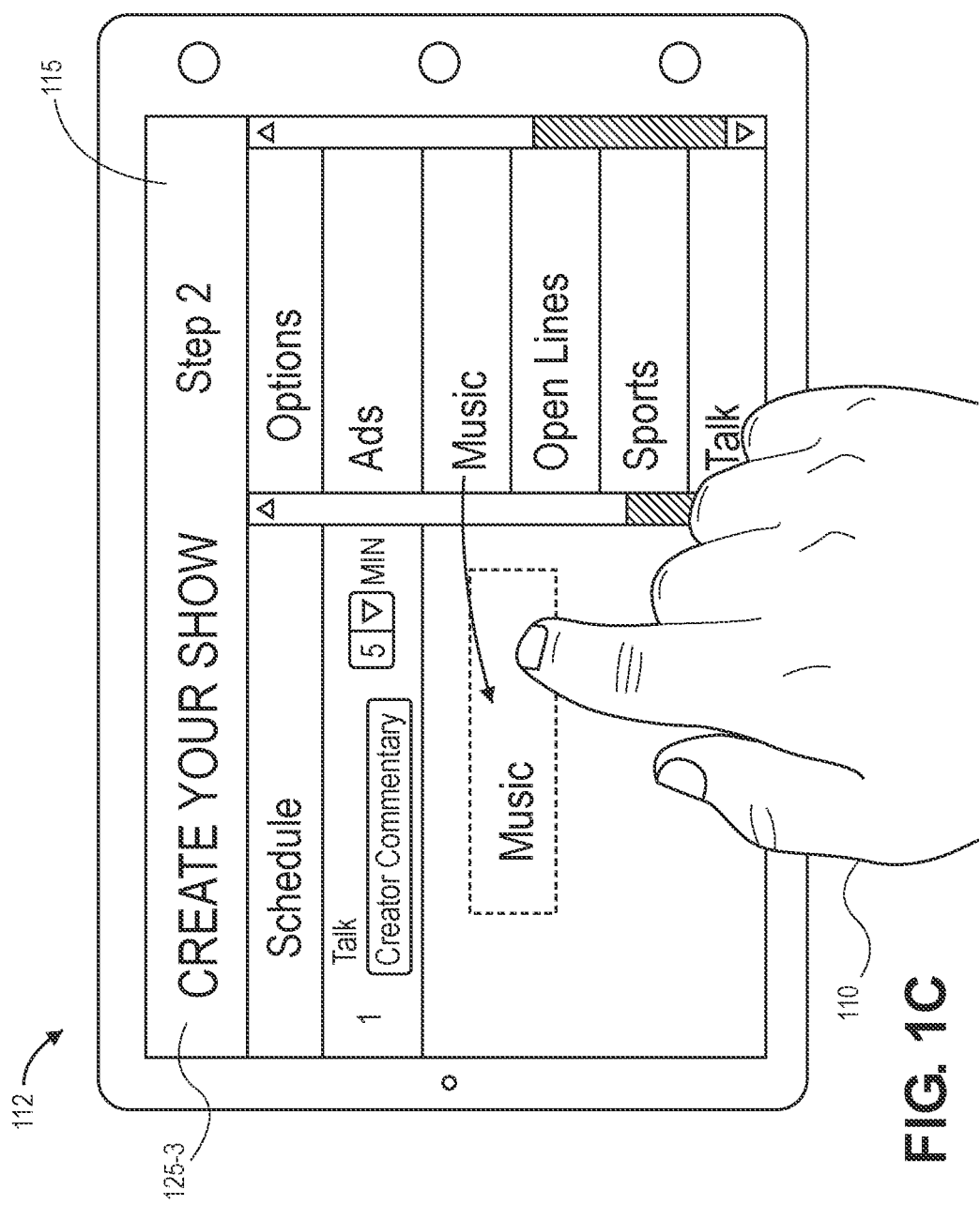

As is shown in FIG. 1C, a user interface 125-3 is rendered on the display 115 of the mobile device 112. The user interface 125-3 includes one or more interactive or selectable elements or features that, when activated by the creator 110, enable the creator 110 to define or otherwise establish a broadcast plan (or sequence of media content) for a media program. For example, as is shown in FIG. 1C, the creator 110 may interact with a list or a set of elements or features (viz., "Options") in one portion of the user interface 125-3, and place one or more of such elements or features on or within another portion of the user interface 125-3 (viz., "Schedule"), e.g., by a drag-and-drop gesture or any other interaction, or in any other manner. Each of the elements or features may correspond to one or more general or specific types of media content to be included in the media program at a given time, and may, when placed within the portion of the user interface 125-3, include one or more interactive features for providing additional attributes or parameters of the media content, which may be of any type or form (e.g., audio content or video content that may be generated live or previously recorded). The elements or features may be placed in an order selected by the creator 110.

For example, as is shown in FIG. 1C, one or more of the elements or features may correspond to media content including advertisements (or promotional materials), music (e.g., songs, albums, stations, playlists or others from a catalog or other collection or repository of music), an open communication session in which a creator and/or one or more listeners may provide media content, sports (e.g., live or previously recorded media content captured prior to, during or after sporting events, or other sports-related media content such as highlights, commentary, interviews, pre-game predictions or post-game analyses, or others), talk (e.g., primarily spoken content from one or more of the creator or any number of listeners), weather (e.g., reports of prevailing or predicted conditions within a vicinity of the mobile device 112 or in any other locations), or others.

In some implementations, one or more of the elements or features may permit the creator 110 to provide or specify one or more text-based descriptions of the media content, e.g., in one or more text boxes or in any other manner. One or more other elements or features may permit the creator 110 to provide or specify a start time, an end time, or a duration of the media content, e.g., with one or more drop-down menus or other features. Still other elements or features may enable the creator 110 to specify an artist, an era, a genre, a mood, a playlist, a title, or other attribute or parameter of the media content.

In some implementations, the user interface 125-3 may include a template for defining one or more attributes or parameters of a broadcast plan for a media program. For example, the user interface 125-3 may include one or more portions having specified sections or regions for accommodating elements or features corresponding to types of media content, or periods of time during which media content are to be played in accordance with a broadcast plan. Such elements or features may include, such as is shown in FIG. 1C, one or more buttons, text boxes, checkboxes, drop-down menus, list boxes, toggles, pickers, search fields, tags, sliders, icons, carousels or others for specifying a description of media content, as well as a start time, an end time, or a duration of the media content, or a specific artist, era, genre, mood, playlist, or title associated with the media content, or any other attributes or parameters of the media content.

Figure 1D:
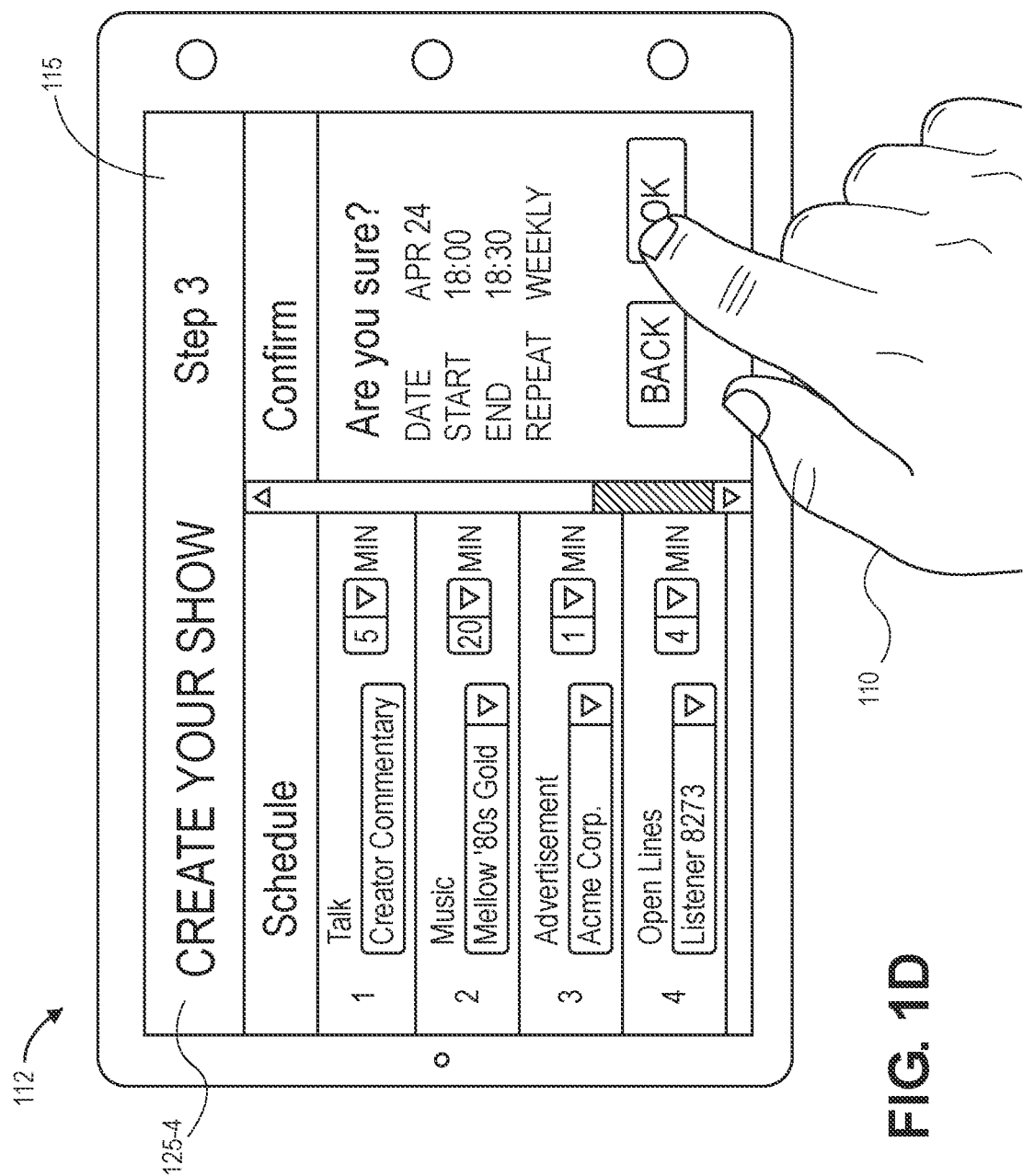

As is shown in FIG. 1D, a user interface 125-4 is rendered on the display 115 of the mobile device 112. The user interface 125-4 includes one or more interactive or selectable elements or features identifying media content (viz., a first set of media content including commentary by the creator 110, followed by a second set of media content including songs or other music, a third set of media content including one or more advertisements, and a fourth set of media content featuring an interview by the creator 110 with a listener) to be included in a broadcast plan or other schedule of a media program. The user interface 125-4 also includes one or more interactive or selectable elements or features that, when activated by the creator 110, enable the creator 110 to modify or confirm the broadcast plan or other schedule of the media program. For example, as is shown in FIG. 1D, one portion of the user interface 125-4 includes elements or features for selecting or changing one or more types or forms of media content that are to be included in a broadcast plan for the media program, as well as durations of such content, or an order of such content, and another portion of the user interface 125-4 includes elements or features for confirming the broadcast plan.

Figure 1E:
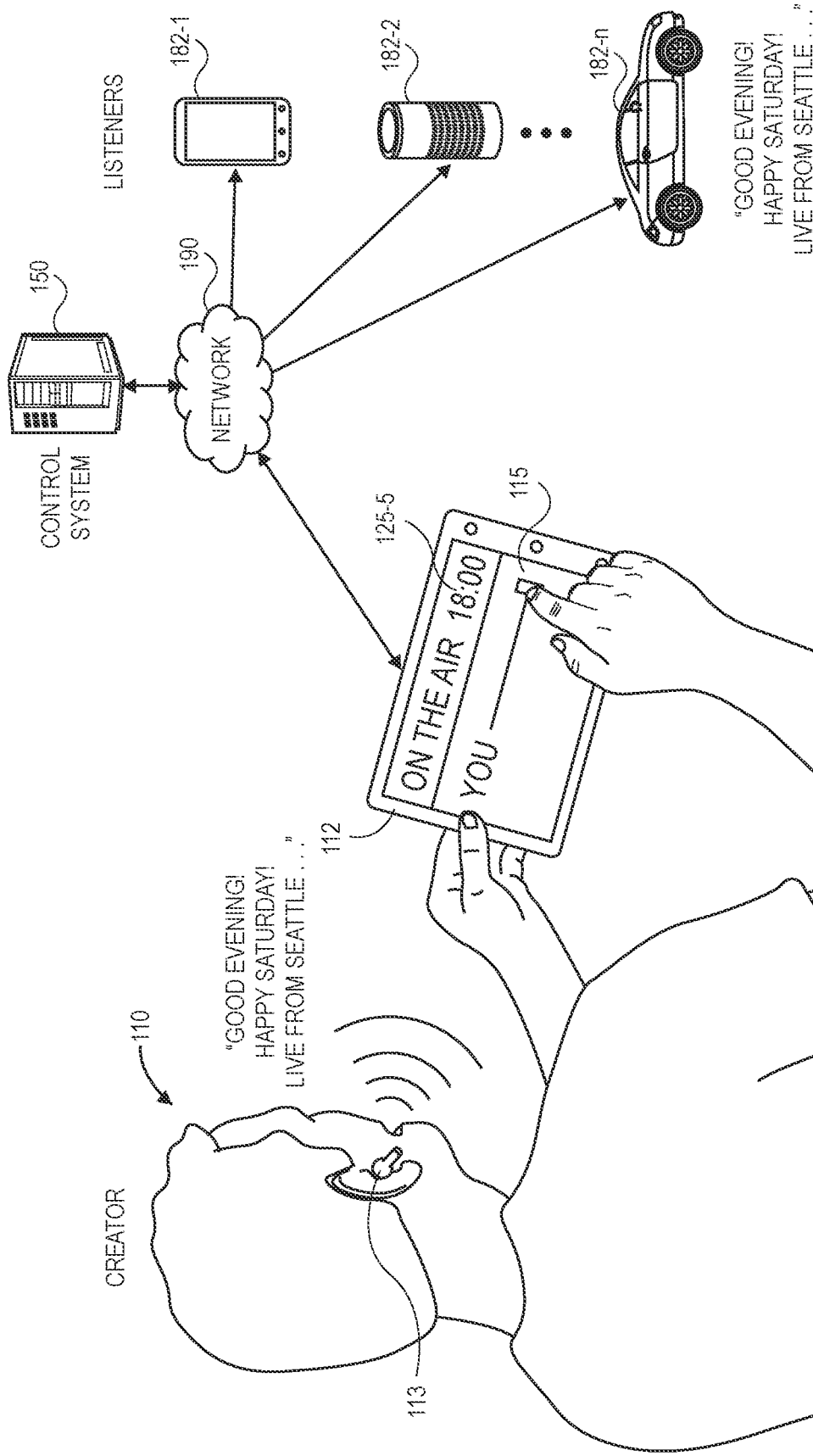

In accordance with implementations of the present disclosure, after the creator 110 has established a broadcast plan for a media program, the creator 110 and the control system 150 may cause data for presenting the media program to be transmitted to one or more computer systems or devices of listeners over one or more networks 190. As is shown in FIG. 1E, at a start time of the media program, the control system 150 may establish a two-way or bidirectional channel or connection (e.g., a conference channel) with the mobile device 112, and one-way or unidirectional channels or connections (e.g., broadcast channels) with devices 182-1, 182-2 . . . 182-$n$ or other systems of any number n of listeners. The devices 182-1, 182-2 . . . 182-$n$ may be of any type or form, including but not limited to mobile devices (e.g., smartphones, tablets or others), smart speakers, media players, computers (e.g., laptop or desktop computers), wrist watches, earphones or headphones, media streaming devices, or others. The channels or connections between the mobile device 112 and the control system 150, or between the control system 150 and the devices 182-1, 182-2 . . . 182-$n$, may be established in any manner, including automatically, e.g., based upon a prior authorization of listeners associated with respective ones of the devices 182-1, 182-2 . . . 182-$n$, at or prior to the start time of the media program. Alternatively, the channels or connections between the mobile device 112 and the control system 150, or between the control system 150 and the devices 182-1, 182-2 . . . 182-$n$, may be established manually, e.g., by one or more interactions with the respective ones of the devices 182-1, 182-2 . . . 182-$n$, either prior to a start time of the media program, or after the media program has already commenced. In some implementations, tasks or functions for establishing such connections may be executed or performed by a single system or device, viz., the control system 150, or by multiple systems or devices, e.g., a mixing system, a conference system, a broadcast system, or any other device or system.

In some implementations, the creator 110 may initiate the media program manually, e.g., by way of one or more interactions with the mobile device 112, at a time of his or her choosing, such as at or near a start time designated in the broadcast plan, or at any other time and in any location. Once the media program has been initiated, data for playing media content may be transmitted to the devices 182-1, 182-2 . . . 182-$n$ of the listeners, over the network 190. In some other implementations, the creator 110 may simply begin speaking or generating other sounds, such as by singing or playing music. Words or sounds generated by the creator 110 may be captured and interpreted by one or more sensors provided in the mobile device 112 or the ear buds 113, and data for playing media content may be transmitted to the devices 182-1, 182-2 . . . 182-$n$ of the listeners, over the network 190.

The creator 110 may exercise control over the media content being played by the devices 182-1, 182-2 . . . 182-$n$ of the listeners. For example, as is shown in FIG. 1E, the creator 110 may manipulate a volume or another attribute or parameter (e.g., treble, bass, or others) of the audio signals transmitted from the mobile device 112, or the volume or other attributes or other parameters of the audio signals represented in data transmitted to the respective devices 182-1, 182-2 . . . 182-$n$ of the listeners, by one or more gestures or other interactions with a user interface 125-5 rendered on the mobile device 112. In response to instructions received from the mobile device 112 by such gestures or interactions, the control system 150 may modify the data transmitted to the respective devices 182-1, 182-2 . . . 182-$n$ of the listeners accordingly.

Alternatively, or additionally, the user interface 125-5 may include one or more elements or features for playing, pausing, stopping, rewinding or fast-forwarding media content to be represented in data transmitted to the respective devices 182-1, 182-2 . . . 182-$n$, or to be played by the respective devices 182-1, 182-2 . . . 182-$n$. The user interface 125-5 may further include one or more elements or features for initiating a playing of any type or form of media content from any source. The control system 150 may establish or terminate channels or connections with such sources, as necessary, or modify data transmitted to the respective devices 182-1, 182-2 . . . 182-$n$ of the listeners to adjust the audio signals played by such devices in response to gestures or other interactions with such elements or features. The user interface 125-5 may further include any visual cues such as "on the air!" or other indicators as to the media content that is currently being played, and from which source, as well as clocks, timers or other representations of durations for which media content has been played, as well as times remaining until a next time when the media content will end or should be terminated, or times at which other media content is to be played.

Figure 1F:
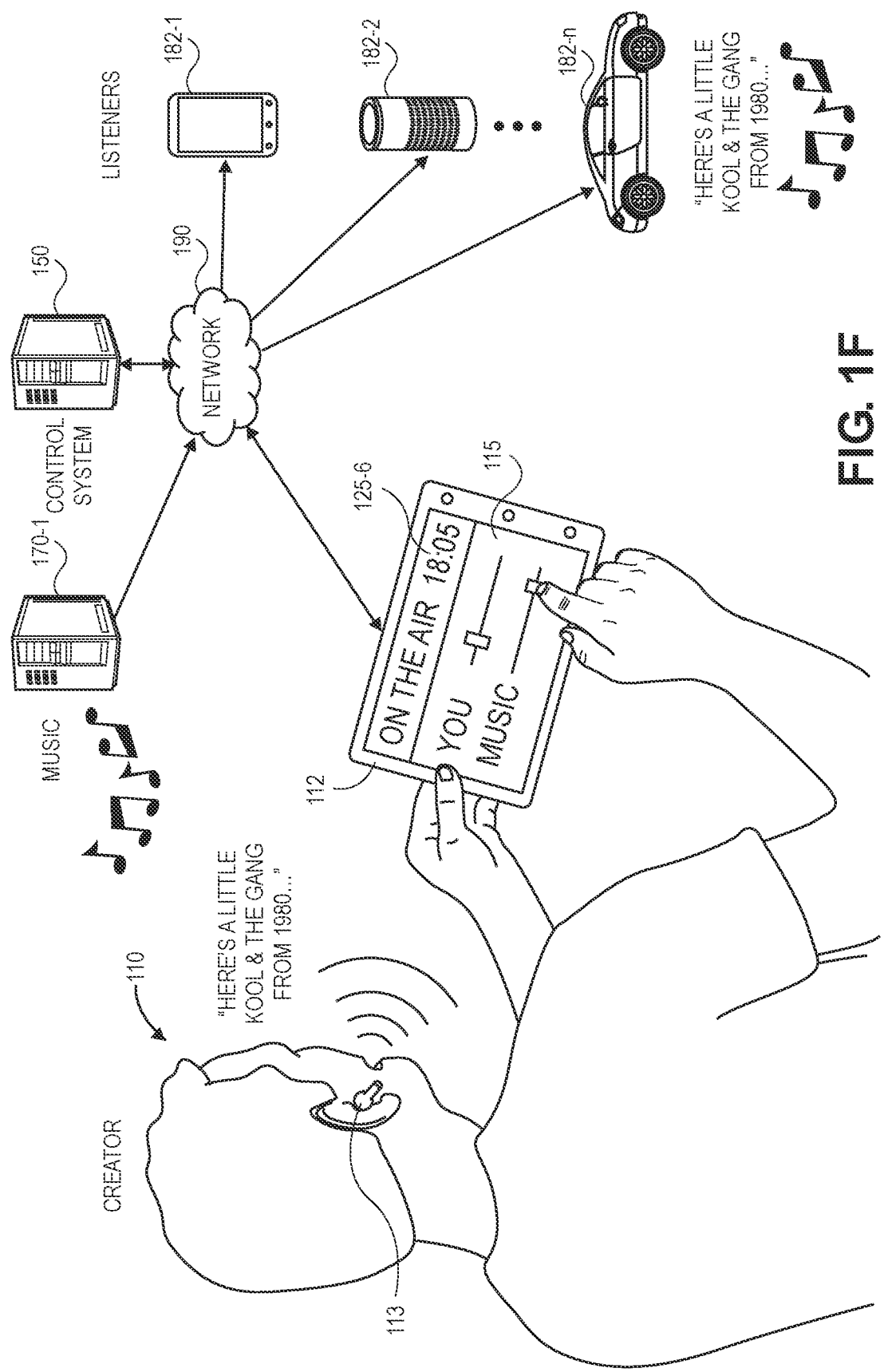

Once a media program has begun, media content may be transmitted to the devices 182-1, 182-2 . . . 182-$n$ of the listeners automatically, e.g., in accordance with the broadcast plan, or at the direction of the creator 110. As is shown in FIG. 1F, the creator 110 may initiate the playing of media content from a music source 170-1 (or catalog or repository), which may be one or more computer systems or devices containing music files stored thereon, by one or more gestures or other interactions with a user interface 125-6 rendered on the mobile device 112. The media content played from the music source 170-1 may be identified by an artist, an era, a genre, a mood, a playlist, a title, or any other attribute or parameter, or may be generally selected from titles by the artist, titles from the era, titles in the genre or mood, or titles in a playlist. Alternatively, the media content played from the music source 170-1 may begin playing automatically at a predetermined time in accordance with the broadcast plan, or automatically upon completion of a prior playing of media content in accordance with the broadcast plan.

The creator 110 may also adjust a volume or another attribute or parameter of media content played from the music source 170-1, or a volume or other attribute or parameter of audio signals corresponding to his or her own voice, by one or more interactions with the user interface 125-6. The control system 150 may establish or terminate channels or connections with the music source 170-1, as necessary, or modify data transmitted to the respective devices 182-1, 182-2 . . . 182-*n* of the listeners to adjust the audio signals played by such devices in response to instructions of the creator 110, which may be received by way of gestures or other interactions with such elements or features.

Similarly, as is shown in FIG. 1G, the creator 110 may initiate the playing of media content from an advertisement source 170-2 (or catalog or repository), which may be one or more computer systems or devices containing audio files with advertisements thereon, by one or more gestures or other interactions with a user interface 125-7 rendered on the mobile device 112. The media content played from the advertisement source 170-2 may be identified with respect to a specific item, good or service, a category of items, goods or services, or a source of or an authority on the items, the goods or the services, or may be a generally selected group of advertisements relating to any number of items, goods or services. Alternatively, the media content played from the advertisement source 170-2 may begin playing automatically at a predetermined time in accordance with the broadcast plan, or automatically upon completion of a prior playing of media content in accordance with the broadcast plan. The creator 110 may also adjust a volume or another attribute or parameter of media content played from the advertisement source 170-2, or a volume or other attribute or parameter of audio signals corresponding to his or her own voice, by one or more interactions with the user interface 125-7. The control system 150 may establish or terminate channels or connections with the advertisement source 170-2, as necessary, or modify data transmitted to the respective devices 182-1, 182-2 . . . 182-*n* of the listeners to adjust the audio signals played by such devices in response to gestures or other interactions with such elements or features.

In some implementations, media content played from a media source, e.g., the advertisement source 170-2, may be deemed to be a priority over any other media content in accordance with a broadcast plan, or to have a higher level of priority than any other media content, including but not limited to words or other sounds of the creator 110. For example, where a source of or an authority on one or more items, goods or services has paid a premium or otherwise requested or been granted rights to a playing of one or more advertisements at a predetermined time, the control system 150 may automatically begin playing the one or more advertisements at the predetermined time, and may adjust volumes or other attributes or parameters of media content, or otherwise establish or terminate connections with one or more computer systems, e.g., the mobile device 112 of the creator 110, as necessary, at the predetermined time.

Figure 1H:
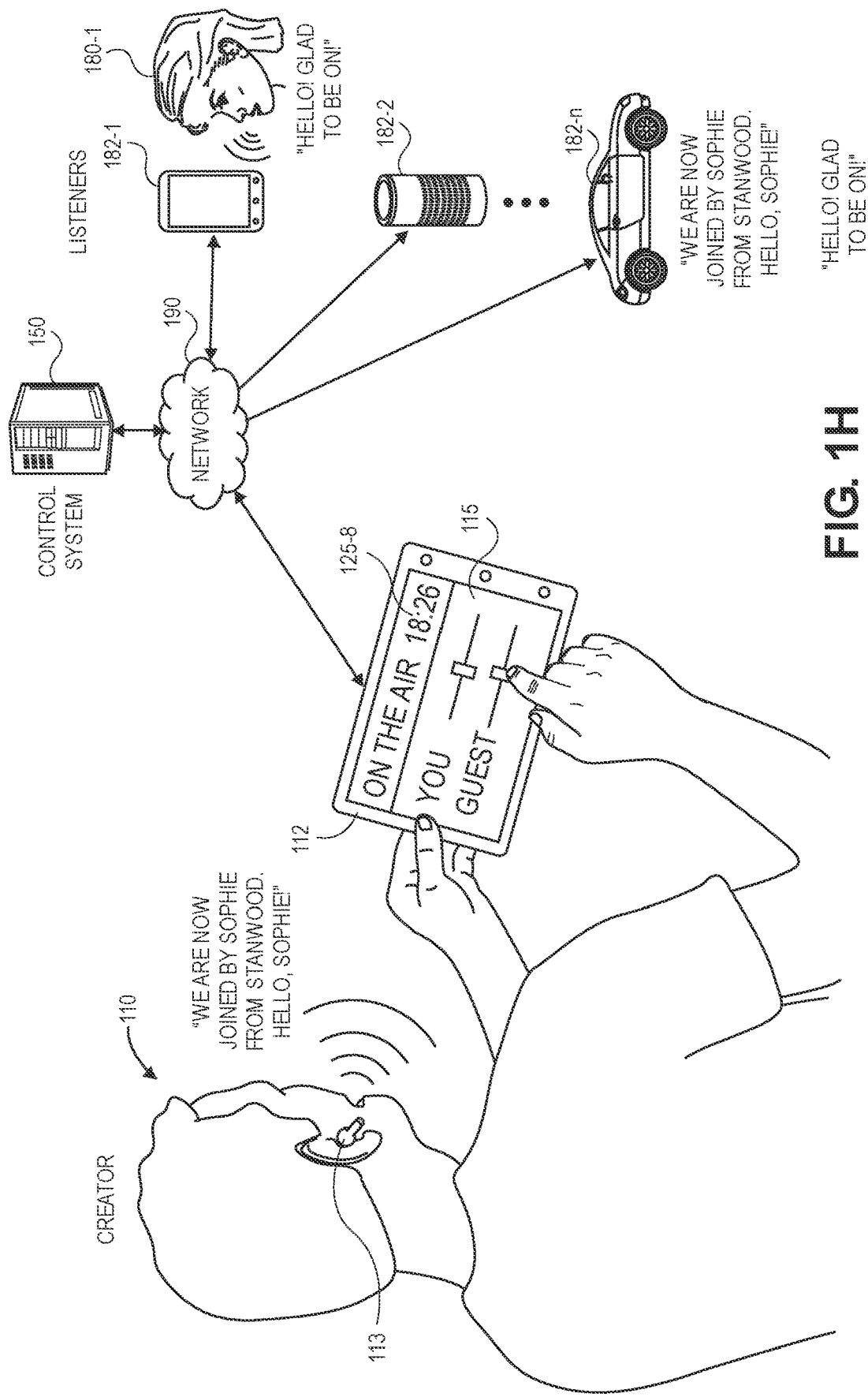

As is shown in FIG. 1H, the creator 110 may also authorize one or more of the listeners to provide media content by way of one or more of the devices 182-1, 182-2 . . . 182-*n*. For example, the creator 110 may designate a portion of the broadcast plan (e.g., a period of time during the media program) during which both the creator 110 and a listener 180-1 are sources of media content to be transmitted to listeners. Alternatively, as the media program is being played, the creator 110 or the control system 150 may receive a request from the listener 180-1, e.g., by way of a device 182-1 of the listener 180-1. The creator 110 may designate or approve the device 182-1 or the listener 180-1 as a source of media content by one or more gestures or other interactions with a user interface 125-8.

The control system 150 may establish or terminate channels or connections with the device 182-1, as necessary, to accommodate the device 182-1 of the listener 180-1 as a source of media content. For example, where the listener 180-1 is to be designated as a source of media content, the control system 150 may terminate a one-way channel, e.g., a broadcast channel, with the device 182-1 and may establish a two-way channel, e.g., a conference channel, with the device 182-1 as necessary. Once a two-way channel has been established with the device 182-1, words or sounds generated by the creator 110 or the listener 180-1 may be received by audio sensors provided on the mobile device 112 or the device 182-1, respectively, and converted to data transmitted to the control system 150. In real time, or in near-real time, the creator 110 may manually adjust a volume or another attribute or parameter of media content received from the listener 180-1, or a volume or other attribute or parameter of audio signals corresponding to his or her own voice, by one or more interactions with the user interface 125-8. Alternatively, the control system 150 may automatically adjust volumes or other attributes or parameters of the media content received from the creator 110 or the listener 180-1, as appropriate. The control system 150 may then transmit such data to any number of devices or systems, e.g., the mobile device 112 or the devices 182-1, 182-2 . . . 182-*n*, over the network 190.

A media program may be terminated by the creator 110 manually, e.g., by one or more gestures or other interactions with the mobile device 112, or automatically, e.g., by the control system 150, at a predetermined end time associated with the broadcast plan. Alternatively, the creator 110 may terminate a media program early, or override a scheduled termination to extend the media program, by one or more gestures or other interactions with the mobile device 112.

Accordingly, the systems and methods of the present disclosure enable nearly anyone with access to a computer system or device to become a creator of a media program. A creator may construct media programs in a live format, or in accordance with a broadcast plan, and a control system, or one or more conference systems, broadcast systems or mixing systems, may synchronize the receipt and mixing of media content from multiple media sources remotely, e.g., in response to gestures or other interactions with one or more user interfaces by the creator, and the transmission of a seamless live audio broadcast of media programs to devices of listeners.

Media content that may be included in a media program includes, but need not be limited to, one or more songs or other music files from a music catalog, repository or streaming service, one or more advertisements of items, goods or services, or one or more news, sports or weather programs, which may be live or previously recorded, as well as voices of a creator or one or more guests, such as musicians, celebrities, personalities, athletes, politicians, or artists, or any listeners to the media program. A control system, or any associated conference systems, broadcast systems or mixing systems, may establish or terminate connections with a creator, with any sources of media content, or with any number of listeners, to compile and efficiently transmit the media program over digital channels (e.g., web-based or application-based), to any number of systems or devices of any form.

One or more of the embodiments disclosed herein may overcome limitations of existing systems and methods for presenting media programs or other content, e.g., radio programs, to listeners. Unbounded by traditional frequency bands or broadcast protocols, the systems and methods of the present disclosure may receive designations of media content from a creator of a media program, e.g., in a broadcast plan, and the media program may be transmitted over one or more networks to any number of listeners in any locations and by way of any devices. Creators of media programs may designate one or more types or files of media content to be broadcast to listeners via a user interface rendered on a display or by any type or form of computer device, in accordance with a broadcast plan or other schedule. A control system, or a mixing system, a conference system or a broadcast system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system (or a control system) and any number of other computer devices or systems. For example, broadcast channels may be established between a broadcast system (or a control system) and sources of media or other content, or between a broadcast system (or a control system) and devices of any number of listeners, for providing media content. Two-way communication channels, or bidirectional channels, may also be established between a conference system (or a control system) and any number of other computer devices or systems. For example, a conference channel may be established between a computer device or system of a creator or another source of media and a conference system (or a control system). Furthermore, one-way or two-way communication channels may be established between a conference system and a mixing system, or between a mixing system and a broadcast system, as appropriate.

Communication channels may be established in any manner, in accordance with implementations of the present disclosure. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called Web Socket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language. This technology, which is known as Server-Sent Events (or SSE), or operates over standard HTTP, and is a novel use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content and established computer devices and systems associated with any type of entity, and in accordance with a broadcast plan or sequence of media content, or at the control or discretion of one or more creators. One or more user interfaces rendered by or on a computer system or device may permit a creator to control the synchronization or mixing of media content by the broadcast system or the mixing system. Gestures or other interactions with the user interfaces may be translated into commands to be processed by the broadcast system or the mixing system, e.g., to play a specific song, to insert a specific advertisement, or to take any other relevant actions, such as to adjust a volume or another attribute or parameter of media content.

Moreover, a broadcast system or the mixing system may provide any relevant information to a creator via such user interfaces, including information regarding attributes or parameters of media content that was previously played, that is being played, or that is scheduled to be played in accordance with a broadcast plan or during a media program. The broadcast system or the mixing system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system or the mixing system may be overridden by a creator, e.g., by one or more gestures or other interactions with a user interface of an application in communication with the broadcast system or the mixing system that may be associated with the playing of the media content or the media program.

Figure 2A:
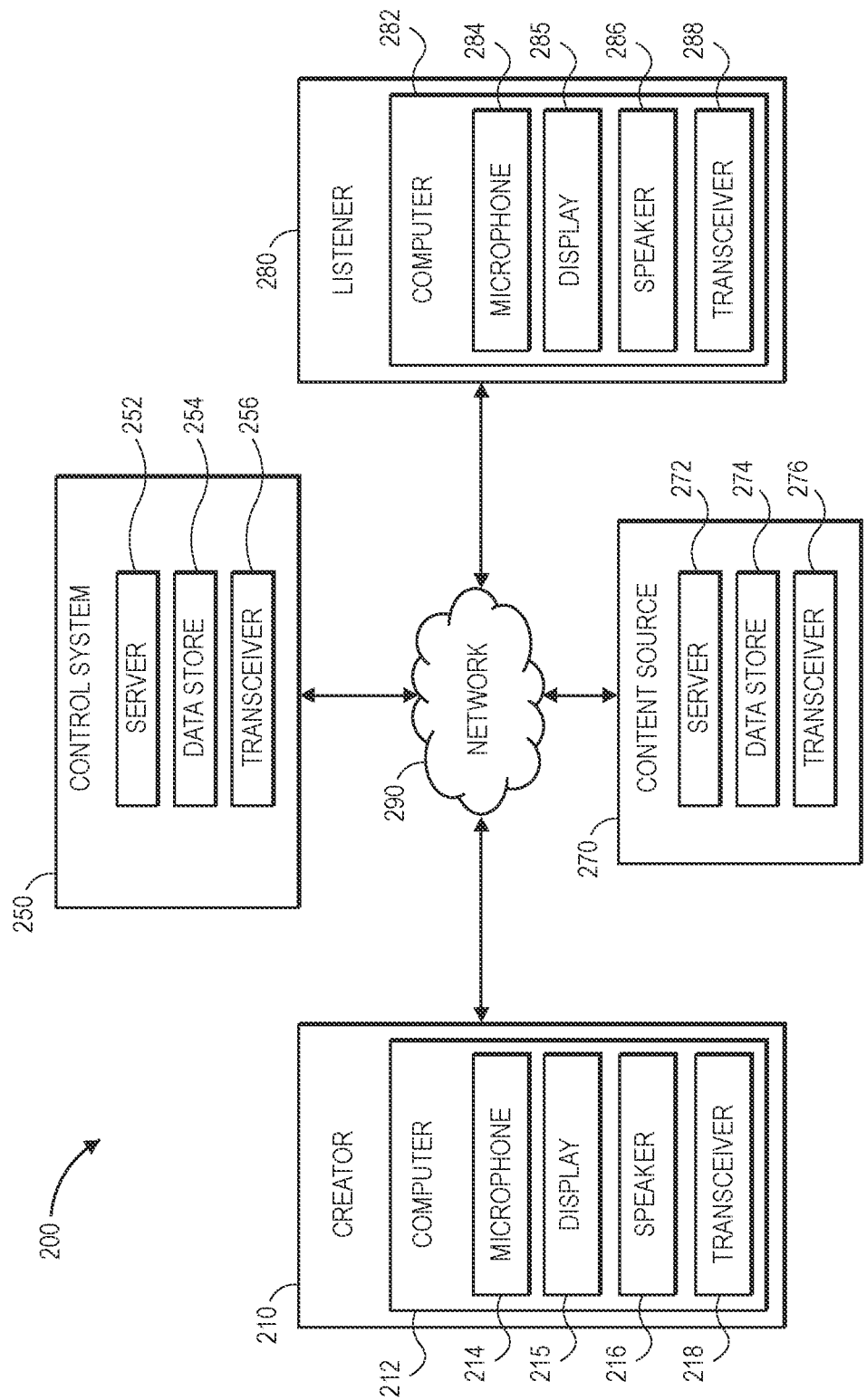
FIGS. 2A and 2B are block diagrams of components of one system for synchronizing media content streams in accordance with embodiments of the present disclosure.
Figure 2B:
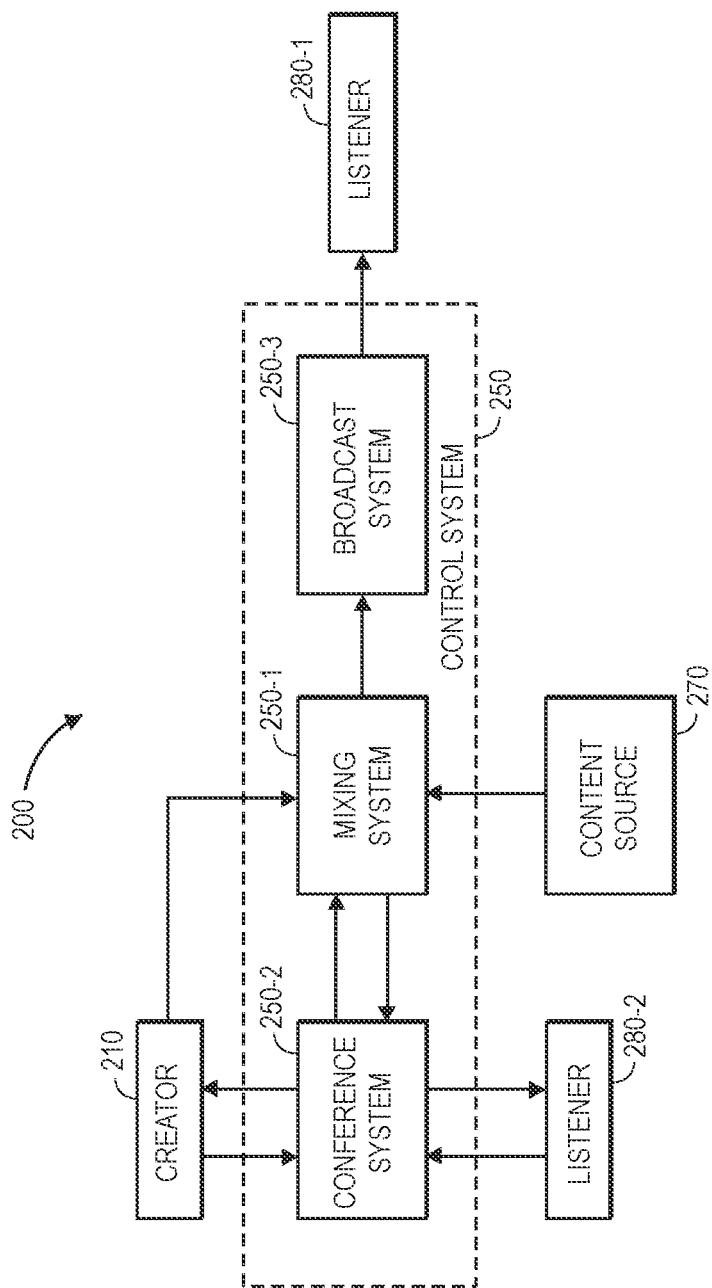

Referring to FIGS. 2A and 2B, block diagrams of components of one system 200 for synchronizing media content streams in accordance with embodiments of the present disclosure is shown. Except where otherwise noted, reference numerals preceded by the number "2" shown in FIG. 2A or FIG. 2B indicate components or features that are similar to components or features having reference numerals preceded by the number "1" shown in FIGS. 1A through 1H.

As is shown in FIG. 2A, the system 200 shown in FIG. 2A includes a creator 210, a control system 250, a content source 270, and a listener 280 that are connected to one another over one or more networks 290.

The creator 210 may be any individual or entity that expresses an interest or an intent in constructing a media program including media content, and providing the media program to the listener 280 over the network 290. As is shown in FIG. 2A, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems (e.g., other aerial vehicles, not shown) via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, such as the ear buds 113 of FIG. 1A, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250, the content source 270 or the listener 280. Alternatively, or additionally, the computer system 212 may be configured to present one or more messages or information to the creator 210 in any other manner, e.g., by voice, and to receive one or more instructions or commands from the creator 210, e.g., by voice.

The control system 250 may be any single system, or two or more of such systems, that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fees. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, who has requested (e.g., subscribed to) media content associated with one or more media programs over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features. In accordance with the present disclosure, a listener 280 that requests to receive media content associated with one or more media programs may also be referred to as a "subscriber" to such media programs or media content.

Those of ordinary skill in the pertinent arts will recognize that the computer devices 212, 282 may include any number of hardware components or operate any number of software applications for playing media content received from the control system 250 and/or the media sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the creator 210, the control system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2A shows boxes for one creator 210, one control system 250, one media source 270, one listener 280, and one network 290, those of ordinary skill in the pertinent arts will recognize that any number of creators 210, control systems 250, media sources 270, listeners 280 or networks 290 may be utilized to transmit, receive, access, hear, or view media content provided in accordance with implementations of the present disclosure. Moreover, the computer devices 212, 252, 272, 282 may include all or fewer of the components shown in FIG. 2A or perform all or fewer of the tasks or functions described herein. Tasks or functions described as being executed or performed by a single system or device associated with the creator 210, the control system 250, the media source 270 or the listener 280 may be executed or performed by multiple systems or devices associated with each of the creator 210, the control system 250, the media source 270 or the listener 280. For example, the tasks or functions described herein as being executed or performed by the control system 250 may be performed by a single system, or by separate systems for establishing two-way connections with the creator 210 or any number of media sources 270, or any other systems, e.g., a mixing system, or for establishing one-way connections with any number of media sources 270 or any number of listeners 280 and transmitting data representing media content, e.g., a broadcast system, from such media sources 270 to such listeners 280. Moreover, two or more creators 210 may collaborate on the construction of a media program.

In some implementations, one or more of the tasks or functions described as being executed or performed by the control system 250 may be performed by multiple systems. For example, as is shown in FIG. 2B, the system 200 may include a mixing system 250-1, a conference system 250-2 and a broadcast system 250-3 that may perform one or more of the tasks or functions described herein as being executed or performed by the control system 250.

As is further shown in FIG. 2B, the mixing system 250-1 may be configured to receive data from the conference system 250-2, as well as from one or more content sources 270. For example, in some implementations, the conference system 250-2 may also be configured to establish two-way communications channels with computer devices or systems associated with the creator 210 (or any number of creators) as well as a listener 280-2 (or any number of listeners) or other authorized host, guests, or contributors to a media program associated with one or more of the creators 210, and form a "conference" including each of such devices or systems. The conference system 250-2 may receive data representing media content such as audio signals in the form of words spoken or sung by one or more of the creator 210, the listener 280-2, or other entities connected to the conference system 250-2, or music or other media content played by the one or more of the creator 210, the listener 280-2, or such other entities, and transmit data representing the media content or audio signals to each of the other devices or systems connected to the conference system 250-2.

In some implementations, the mixing system 250-1 may also be configured to establish a two-way communications channel with the conference system 250-2, thereby enabling the mixing system 250-1 to receive data representing audio signals from the conference system 250-2, or transmit data representing audio signals to the conference system 250-2. For example, in some implementations, the mixing system 250-1 may act as a virtual participant in a conference including the creator 210 and any listeners 280-2, and may receive data representing audio signals associated with any participants in the conference, or provide data representing audio signals associated with media content of the media program, e.g., media content received from any of the content sources 270, to such participants.

The mixing system 250-1 may also be configured to establish a one-way communications channel with the content source 270 (or with any number of content sources), thereby enabling the mixing system 250-1 to receive data representing audio signals corresponding to advertisements, songs or media files, news programs, sports programs, weather reports or any other media files, which may be live or previously recorded, from the content source 270. The mixing system 250-1 may be further configured to establish a one-way communications channel with the broadcast system 250-3, and to transmit data representing media content received from the creator 210 or the listener 280-2 by way of the conference channel 250-2, or from any content sources 270, to the broadcast system 250-3 for transmission to any number of listeners 280-1.

The mixing system 250-1 may be further configured to receive information or data from one or more devices or systems associated with the creator 210, e.g., one or more instructions for operating the mixing system 250-1. For example, in some implementations, the mixing system 250-1 may be configured to cause any number of connections to be established between devices or systems and one or more of the conference system 250-2 or the broadcast system 250-3, or for causing data representing media content of any type or form to be transmitted to one or more of such devices or systems in response to such instructions. In some implementations, the mixing system 250-1 may also be configured to initiate or modify the playing of media content, such as by playing, pausing or stopping the media content, advancing (e.g., "fast-forwarding") or rewinding the media content, increasing or decreasing levels of volume of the media content, or setting or adjusting any other attributers or parameters (e.g., treble, bass, or others) of the media content, in response to such instructions or automatically.

The broadcast system 250-3 may be configured to establish one-way communications channels with any number of listeners 280-1, and to transmit data representing media content received from the mixing system 250-1 to each of such listeners 280-1.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein.

Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the control system 250 (or the mixing system 250-1, the conference system 250-2, or the broadcast system 250-3), the media source 270 or the listener 280 (or the listeners 280-1, 280-2) may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the control system 250 (or the mixing system 250-1, the conference system 250-2, or the broadcast system 250-3), the media source 270 or the listener 280 (or the listeners 280-1, 280-2), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
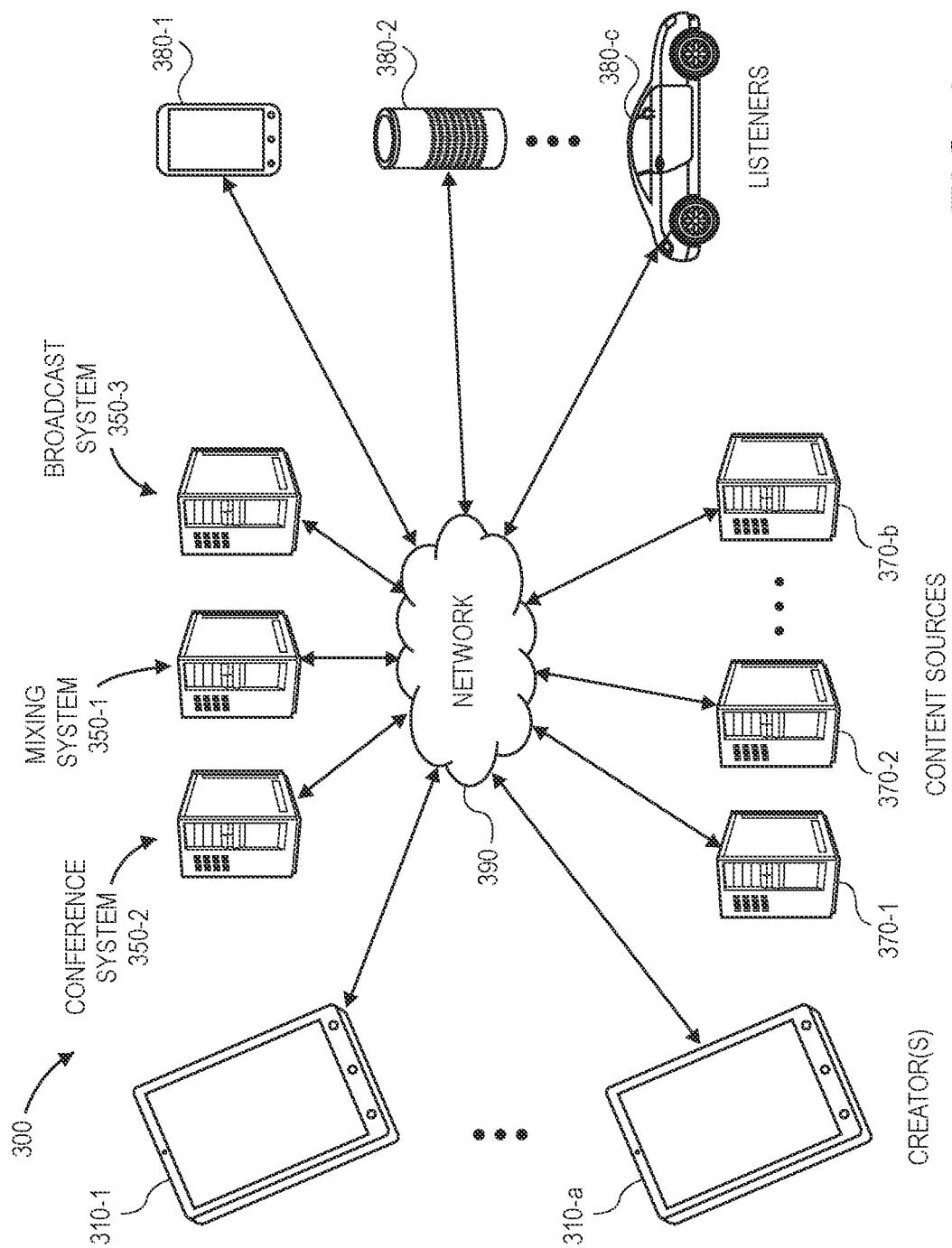
FIG. 3 is a view of aspects of one system for synchronizing media content streams in accordance with embodiments of the present disclosure.

Referring to FIG. 3, a view of aspects of one system for synchronizing media content streams in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2A or FIG. 2B or by the number "1" shown in FIGS. 1A through 1H. As is shown in FIG. 3, the system 300 includes computer systems or devices of a plurality of creators 310-1 . . . 310-a, a mixing system 350-1, a conference system 350-2, a broadcast system 350-3, a plurality of content sources 370-1, 370-2 . . . 370-b and a plurality of listeners 380-1, 380-2 . . . 380-c that are connected to one another over a network 390, which may include the Internet in whole or in part.

The creators 310-1 . . . 310-a may operate a computer system or device having one or more microphones, an interactive display, one or more speakers, one or more processors and one or more transceivers configured to enable communication with one or more other computer systems or devices. In some implementations, the creators 310-1 . . . 310-a may operate a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the mixing system 350-1, the conference system 350-2 or the broadcast system 350-3. Alternatively, the creators 310-1 . . . 310-a may operate any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the mixing system 350-1 may be any server or other computer system or device configured to receive information or data from the creators 310-1 . . . 310-a, or any of the listeners 380-1, 380-2 . . . 380-c, e.g., by way of the conference system 350-2, or from any of the media sources 370-1, 370-2 . . . 370-b over the network 390. The mixing system 350-1 may be further configured to transmit any information or data to the broadcast system 350-3 over the network 390, and to cause the broadcast system 350-3 to transmit any of the information or data to any of the listeners 380-1, 380-2 . . . 380-c, in accordance with a broadcast plan (or a sequence of media content, or another schedule), or at the direction of the creators 310-1 . . . 310-a. The mixing system 350-1 may also transmit or receive information or data along such communication channels, or in any other manner. The operation of the mixing system 350-1, e.g., the establishment of connections, or the transmission and receipt of data via such connections, may be subject to the control or discretion of any of the creators 310-1 . . . 310-a.

In some implementations, the mixing system 350-1 may receive media content from one or more of the media sources 370-1, 370-2 . . . 370-b, and cause the media content to be transmitted to one or more of the creators 310-1 . . . 310-a or the listeners 380-1, 380-2 . . . 380-c by the broadcast system 350-3. In some other implementations, the mixing system 350-1 may receive media content from one or more of the media sources 370-1, 370-2 . . . 370-*b*, and mix, or combine, the media content with any media content received from the creators 310-1 . . . 310-*a* or any of the listeners 380-1, 380-2 . . . 380-*c*, before causing the media content to be transmitted to one or more of the creators 310-1 . . . 310-*a* or the listeners 380-1, 380-2 . . . 380-*c* by the conference system 350-2 or the broadcast system 350-3. For example, in some implementations, the mixing system 350-1 may receive media content (e.g., audio content and/or video content) captured live by one or more sensors of one or more of the media sources 370-1, 370-2 . . . 370-*b*, e.g., cameras and/or microphones provided at a location of a sporting event, or any other event, and mix that media content with any media content received from any of the creators 310-1 . . . 310-*a* or any of the listeners 380-1, 380-2 . . . 380-*c*. In such embodiments, the creators 310-1 . . . 310-*a* may act as sportscasters, news anchors, weathermen, reporters or others, and may generate a media program that combines audio or video content captured from a sporting event or other event of interest, along with audio or video content received from one or more of the creators 310-1 . . . 310-*a* or any of the listeners 380-1, 380-2 . . . 380-*c* before transmitting causing the media program to be transmitted to the listeners 380-1, 380-2 . . . 380-*c* by the conference system 350-2 or the broadcast system 350-3.

In some implementations, the conference system 350-2 may establish two-way communications channels between any of the creators 310-1 . . . 310-*a* and, alternatively, any of the listeners 380-1, 380-2 . . . 380-*c*, who may be invited or authorized to participate in a media program, e.g., by providing media content in the form of spoken or sung words, music, or any media content, subject to the control or discretion of the creators 310-1 . . . 310-*a*. Devices or systems connected to the conference system 350-2 may form a "conference" by transmitting or receiving information or data along such communication channels, or in any other manner. The operation of the mixing system 350-1, e.g., the establishment of connections, or the transmission and receipt of data via such connections, may be subject to the control or discretion of the creators 310-1 . . . 310-*a*. In some implementations, the mixing system 350-1 may effectively act as a virtual participant in such a conference, by transmitting media content received from any of the media sources 370-1, 370-2 . . . 370-*b* to the conference system 350-2 for transmission to any devices or systems connected thereto, and by receiving media content from any of such devices or systems by way of the conference system 350-2 and transmitting the media content to the broadcast system 350-3 for transmission to any of the listeners 380-1, 380-2 . . . 380-*c*.

Likewise, the broadcast system 350-3 may be any server or other computer system or device configured to receive information or data from the mixing system 350-1, or transmit any information or data to any of the listeners 380-1, 380-2 . . . 380-*c* over the network 390. In some implementations, the broadcast system 350-3 may establish one-way communications channels with the mixing system 350-1 or any of the listeners 380-1, 380-2 . . . 380-*c* in accordance with a broadcast plan (or a sequence of media content, or another schedule), or at the direction of the creators 310-1 . . . 310-*a*. The broadcast system 350-3 may also transmit or receive information or data along such communication channels, or in any other manner. The operation of the broadcast system 350-3, e.g., the establishment of connections, or the transmission of data via such connections, may be subject to the control or discretion of the creators 310-1 . . . 310-*a*.

The content sources 370-1, 370-2 . . . 370-*b* may be servers or other computer systems having media content stored thereon, or access to media content, that are configured to transmit media content to the creators 310-1 . . . 310-*a* or any of the listeners 380-1, 380-2 . . . 380-*c* in response to one or more instructions or commands from the creators 310-1 . . . 310-*a* or the mixing system 350-1. The media content stored on or accessible to the content sources 370-1, 370-2 . . . 370-*b* may include one or more advertisements, songs or media files, news programs, sports programs, weather reports or any other media files, which may be live or previously recorded. The number of content sources 370-1, 370-2 . . . 370-*b* that may be accessed by the mixing system 350-1, or the types of media content stored thereon or accessible thereto, is not limited.

The listeners 380-1, 380-2 . . . 380-*c* may also operate any type or form of computer system or device configured to receive and present media content, e.g., at least a portion of an automobile, a desktop computer, a laptop computer, a media player, a smartphone, a smart speaker, a tablet computer, a television, or a wristwatch, or others.

The mixing system 350-1, the conference system 350-2 or the broadcast system 350-3 may establish or terminate connections with the creators 310-1 . . . 310-*a*, with any of the content sources 370-1, 370-2 . . . 370-*b*, or with any of the listeners 380-1, 380-2 . . . 380-*c*, as necessary, to compile and seamlessly transmit media programs over digital channels (e.g., web-based or application-based), to devices of the creators 310-1 . . . 310-*a* or the listeners 380-1, 380-2 . . . 380-*c* in accordance with a broadcast plan, or subject to the control of the creators 310-1 . . . 310-*a*. Furthermore, in some implementations, one or more of the listeners 380-1, 380-2 . . . 380-*c*, e.g., musicians, celebrities, personalities, athletes, politicians, or artists, may also be content sources. For example, where the broadcast system 350-3 has established one-way channels, e.g., broadcast channels, with any of the listeners 380-1, 380-2 . . . 380-*c*, the mixing system 350-1 may terminate one of the one-way channels with one of the listeners 380-1, 380-2 . . . 380-*c*, and cause the conference system 350-2 to establish a two-directional channel with that listener, thereby enabling that listener to not only receive but also transmit media content to the creators 310-1 . . . 310-*a* or any of the other listeners.

Those of ordinary skill in the pertinent arts will recognize that any of the tasks or functions described above with respect to the mixing system 350-1, the conference system 350-2 or the broadcast system 350-3 may be performed by a single device or system, e.g., a control system, or by any number of devices or systems.

Figure 4:
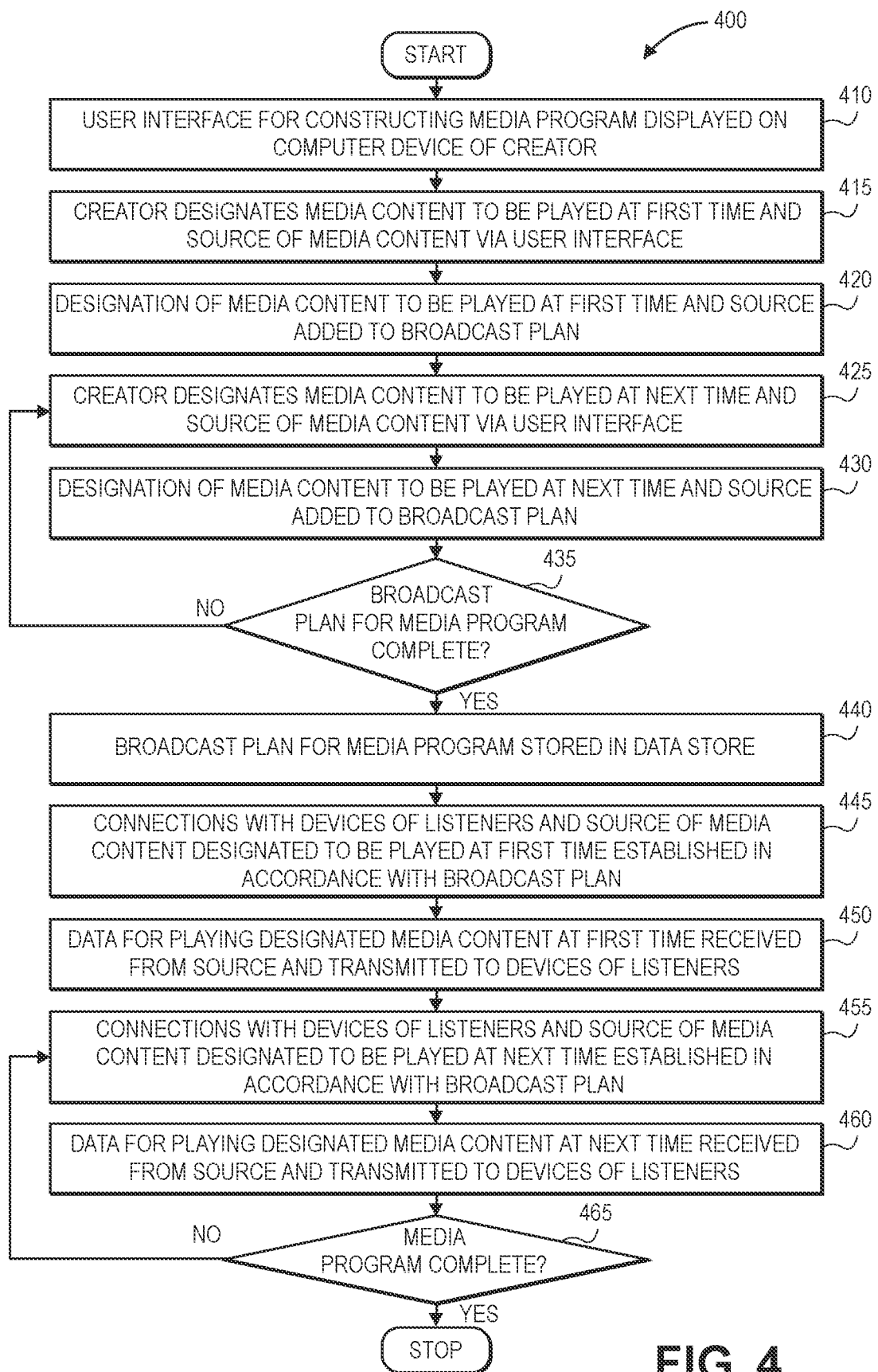
FIG. 4 is a flow chart of one process for synchronizing media content streams in accordance with embodiments of the present disclosure.

Referring to FIG. 4, a flow chart of one process for synchronizing media content streams in accordance with embodiments of the present disclosure is shown.

At box 410, one or more user interfaces for constructing a media program are displayed on a computer device of a creator. For example, the user interfaces may be associated with a network page (e.g., a web page) rendered by a browser, or a dedicated application for constructing media programs operating on the computer device of the creator. The user interfaces may include any number of buttons, text boxes, checkboxes, drop-down menus, list boxes, toggles, pickers, search fields, tags, sliders, icons, carousels, or any other interactive or selectable elements or features. In some implementations, the user interfaces may include one or more elements or features enabling the creator to indicate his or her intent or interest in constructing a broadcast plan (or other schedule) of a media program, or to define one or more attributes or parameters of the media program, including but not limited to a start date or time for the media program, a duration of the media program, or a designation of whether the media program is to air on a single occasion or be repeated, and at which frequency. The user interfaces may also permit the creator to describe the media program, e.g., in one or more sets of text or images. Alternatively, two or more creators may collaborate on the construction of a media program, and such user interfaces may be displayed on devices of each of such creators.

At box 415, the creator designates media content to be played at a first time and a source of the media content via the one or more user interfaces. For example, the creator may designate periods during which live or previously recorded media content is to be included in the media program, including but not limited to media content of any type or form, using any elements or features rendered on the user interface. In some implementations, the creator may designate periods during which the creator may speak or generate one or more other sounds (e.g., music played by the creator, or words spoken or sung by the creator), as well as advertisements, music, news, sports, weather, or other programming, or interviews or other files or content generated by one or more other individuals. The media content may be identified by an artist, an era, a genre, a mood, a playlist, a title, or any other attribute or parameter of the media content, and a location of the media content, which may include but need not be limited to songs or other music files from a music catalog, repository or streaming service; advertisements of items, goods or services; or one or more news, sports or weather programs, which may be live or previously recorded, as well as spoken or sung words or music of a creator or one or more guests, such as musicians, celebrities, personalities, athletes, politicians, or artists, or any listeners to the media program.

At box 420, a designation of the media content to be played at the first time and the source of the media content is stored in a broadcast plan, which may be a record or other file maintained on one or more memory components or data stores, on the computer device of the creator or in one or more alternate or virtual locations, e.g., in a "cloud"-based environment.

At box 425, the creator designates media content to be played at a next time and a source of the media content via the user interfaces. For example, the media content may be of the same type or form as the media content designated for playing at the first time, or of another type or form, and may be designated or identified in any manner, e.g., by any interactive or selectable elements or features rendered on the user interfaces. At box 430, a designation of the media content to be played at the next time and the source of the media content is stored in the broadcast plan.

At box 435, whether the broadcast plan for the media program is complete is determined. For example, the creator may select one or more elements or features on the user interfaces, or otherwise indicate that the broadcast plan is complete, or that no additional media content is to be added to the broadcast plan. If the broadcast plan for the media program is not complete, then the process returns to box 425, where the creator designates media content to be played at a next time via the user interface, e.g., by any interactive or selectable elements or features.

If the broadcast plan for the media program is complete, however, then the process advances to box 440, where the broadcast plan is stored in one or more data stores. For example, the broadcast plan may be transmitted in any manner, such as by one or more messaging techniques (e.g., electronic mail, text messages, social media messages, or others), or by a direct connection via a browser or other application operating on the computer device of the creator, to a control system or any other computer devices or systems (e.g., a mixing system).

At box 445, connections with devices of listeners and with a source of the media content designated for playing at the first time in accordance with the broadcast plan are established. For example, in some implementations, a conference system, or a control system, may establish a two-way communications channel, e.g., a conference channel, with the computer device of the creator, such as by Web Socket or any other technique or protocol. In some implementations, a mixing system, or a control system may further establish one-way communications channels with sources of the media content that is designated to be played at the first time in accordance with the broadcast plan. In some implementations, a broadcast system, or a control system, may further establish one-way communications channels, e.g., broadcast channels, with any number of devices associated with listeners to the media program.

At box 450, data for playing the designated media content at the first time is received from the source and transmitted to devices of listeners. In some implementations, a mixing system, or a control system, may retrieve designated media content from a source and transmit the designated media content to the systems or devices of the one or more listeners, or otherwise cause the designated media content to be transmitted from a source to the systems or devices of the one or more listeners. For example, where the media content designated at the first time is audio content (e.g., spoken or sung words, or music) of the creator, data for presenting the content may be captured by a computer device of the creator and transmitted to a conference system, or a control system. A mixing system, or the control system, may transmit the audio content directly to devices of the listeners over one or more networks in real time or near-real time. Where the media content designated at the first time is advertisements, music, news, sports, weather, or other programming, data for presenting the content may be transmitted from the computer device of the source of the programming to a mixing system, or a control system, which may transmit the data to the devices of the listeners over the one or more networks, as well as to a conference system in communication with a computer device of a creator, or directly to the computer device of the creator. Where the media content designated at the first time originates from two or more sources, e.g., the creator and one or more other sources, or from two sources not including the creator, data for presenting the content may be transmitted to a mixing system, or a control system, which may synthesize, mix or otherwise combine the media content before transmitting the synthesized, mixed or combined content to devices of the listeners over the one or more networks, and also to a conference system in communication with a computer device of a creator, or directly to the computer device of the creator.

In some implementations, the creator may execute one or more gestures or other interactions with the user interfaces to initiate or modify the playing of the media content. For example, the creator may play or pause media content, or increase or decrease a level of volume or modify any other attributers or parameters (e.g., treble, bass, or others) of the media content, by one or more features on the user interfaces. Alternatively, in some implementations, a mixing system or a control system may be programmed or configured to automatically initiate or modify the playing of the media content. For example, a mixing system or a control system may automatically modify a volume level of speech or other sounds of the creator with respect to a volume level of advertisements, music, news, sports, weather, or other programming, or automatically initiate or terminate the playing of advertisements, music, news, sports, weather, or other programming upon sensing that the creator is speaking, or is no longer speaking, as necessary.

At box 455, connections with devices or listeners and with a source of the media content designated for playing at a next time in accordance with the broadcast plan are established, e.g., by the same system that established the connections at box 445, or by one or more other systems. For example, to the extent that a mixing system or a control system established channels with the creator or with a first source of media content to be played at the first time, the broadcast system or the mixing system may terminate one or more of such connections, or establish a channel with a second source of media content to be played at the next time. Alternatively, where the designated media content to be played at the next time is also maintained by the source of the media content that was played at the first time, no further connections need be established. Furthermore, in some implementations, where a device of a listener to the media content played at the first time is a source of media content to be played at the next time, or vice versa, a one-way channel established between a broadcast system or a control system and the device of the listener at the first time may be terminated, and a two-way channel may be established between a conference system or a control system at the next time, or vice versa.

At box 460, data for playing the designated media content at the next time is received from the source and transmitted to the devices of the listeners, e.g., from a source of the designated media content to a mixing system or a control system, and then from a broadcast system or the control system to the devices of the listeners, and also to the computer device of the creator, e.g., by way of a conference system or directly.

At box 465, whether the media program is complete is determined. For example, if the designated media content is the final media content to be played in accordance with the broadcast plan, the media program may be deemed complete when the playing of the designated media content is complete. If the media program is scheduled to be complete at a predetermined time or after a predetermined duration, then the media program may be deemed complete at the predetermined time or following the predetermined duration. Alternatively, the creator may terminate the media program in accordance with the broadcast plan or at any other time, e.g., manually by one or more gestures or interactions with the one or more user interfaces. If the media program is not complete, then the process returns to box 455, where connections with devices or listeners and with a source of the media content designated for playing at a next time in accordance with the broadcast plan are established. If the media program is complete, however, then the process ends.

As is discussed above, communications connections may be established between computer systems or devices of a creator, and computer systems of media sources or listeners, as necessary in order to present a media program constructed by the creator to the listeners in accordance with a broadcast plan, or at the control or discretion of the creator. Referring to FIGS. 5A through 5E, views of aspects of one system for synchronizing media content streams in accordance with embodiments of the present disclosure are shown. Except where otherwise noted, reference numerals preceded by the number "5" shown in FIGS. 5A through 5E indicate components or features that are similar to components or features having reference numerals preceded by the number "3" shown in FIG. 3, by the number "2" shown in FIG. 2A or FIG. 2B or by the number "1" shown in FIGS. 1A through 1H.

Figure 5A:
FIGS. 5A through 5E are views of aspects of one system for synchronizing media content streams in accordance with embodiments of the present disclosure.

As is shown in FIG. 5A, a mobile device 512 of a creator 510 includes a microphone 514, an interactive display 515 and a speaker 516. The interactive display 515 has a user interface 525 with a broadcast plan (or sequence of media) for a media program rendered thereon. The user interface 525 enables the creator 510 to adjust or modify the broadcast plan, or to otherwise specify one or more attributes or parameters of the media program by one or more interactions with the interactive display 515, or with the user interface 525 rendered thereon. As is shown in FIG. 5A, the broadcast plan calls for a first period of five minutes of media content in the form of commentary by the creator 510, from 18:00 to 18:05, followed by a second period of twenty minutes of media content in the form of music from a selected playlist from 18:05 to 18:25. The broadcast plan further calls for a third period of one minute of media content in the form of an advertisement from 18:25 to 18:26, followed by a fourth period of four minutes of media content in the form of an interview with one of the listeners from 18:26 to 18:30.

Figure 5B:
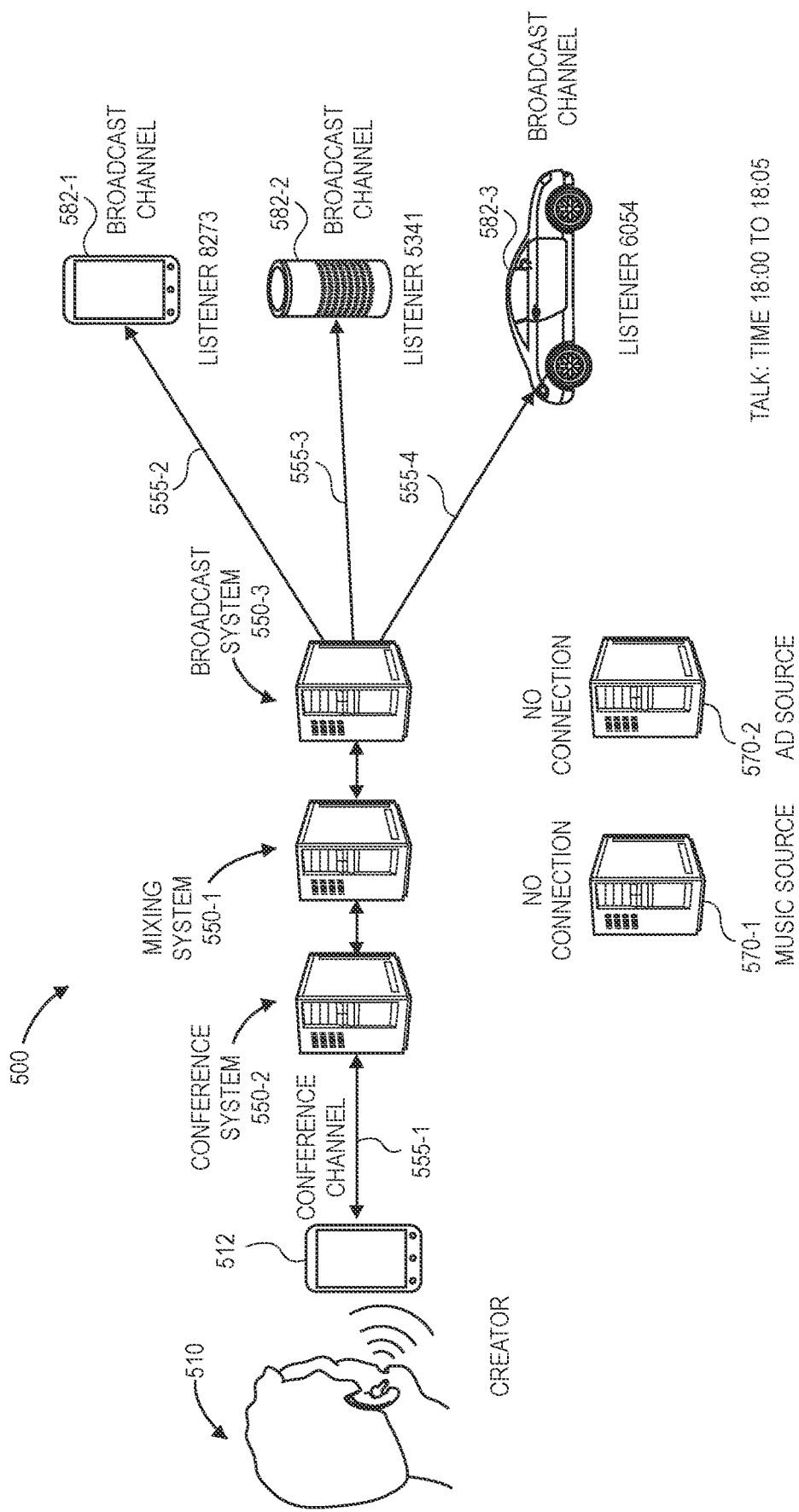

As is shown in FIG. 5B, a system 500 includes the mobile device 512 of the creator 510, as well as a mixing system 550-1, a conference system 550-2, a broadcast system 550-3, a plurality of content sources 570-1, 570-2 and a plurality of devices 582-1, 582-2, 582-3 associated with listeners that may be connected to one another over one or more networks, which may include the Internet in whole or in part. In particular, and as is shown in FIG. 5B, the mixing system 550-1 is connected to each of the conference system 550-2 and the broadcast system 550-3.

In accordance with the broadcast plan, or at the direction of the creator 510, the mixing system 550-1 causes a conference channel 555-1, e.g., a bidirectional communication channel, or a two-way communication channel, to be established between the conference system 550-2 and the mobile device 512 in order to accommodate the first period of commentary in accordance with the broadcast plan. The conference channel 555-1 enables the creator 510 to not only provide media content in the form of words or other sounds but also to receive media content, e.g., the words or other sounds, during this period. In some implementations, the mixing system 550-1 may act as a virtual participant in a conference with the mobile device 512 of the creator 510, thereby enabling the creator 510 to provide media content to the mixing system 550-1 by way of the conference system 550-2, and to receive media content from the mixing system 550-1 by way of the conference system 550-2.

The broadcast system 550-3 further establishes broadcast channels 555-2, 555-3, 555-4, e.g., unidirectional communications channels, or one-way communication channels, with each of the devices 582-1, 582-2, 582-3 of the listeners. The broadcast channels 555-2, 555-3, 555-4 enable the devices 582-1, 582-2, 582-3 of the listeners to receive media content of the media program from the broadcast system 550-3 over the network 590, while occupying a substantially smaller portion of bandwidth and requiring a substantially smaller portion of processing power than if each of the devices 582-1, 582-2, 582-3 had established conference channels with the conference system 550-2. Although the system 500 of FIG. 5B shows just three devices 582-1, 582-2, 582-3 of listeners, any number of devices of listeners may be configured to receive media content of the media program by establishing one-way communications channels with the broadcast system 550-3.

Figure 5C:
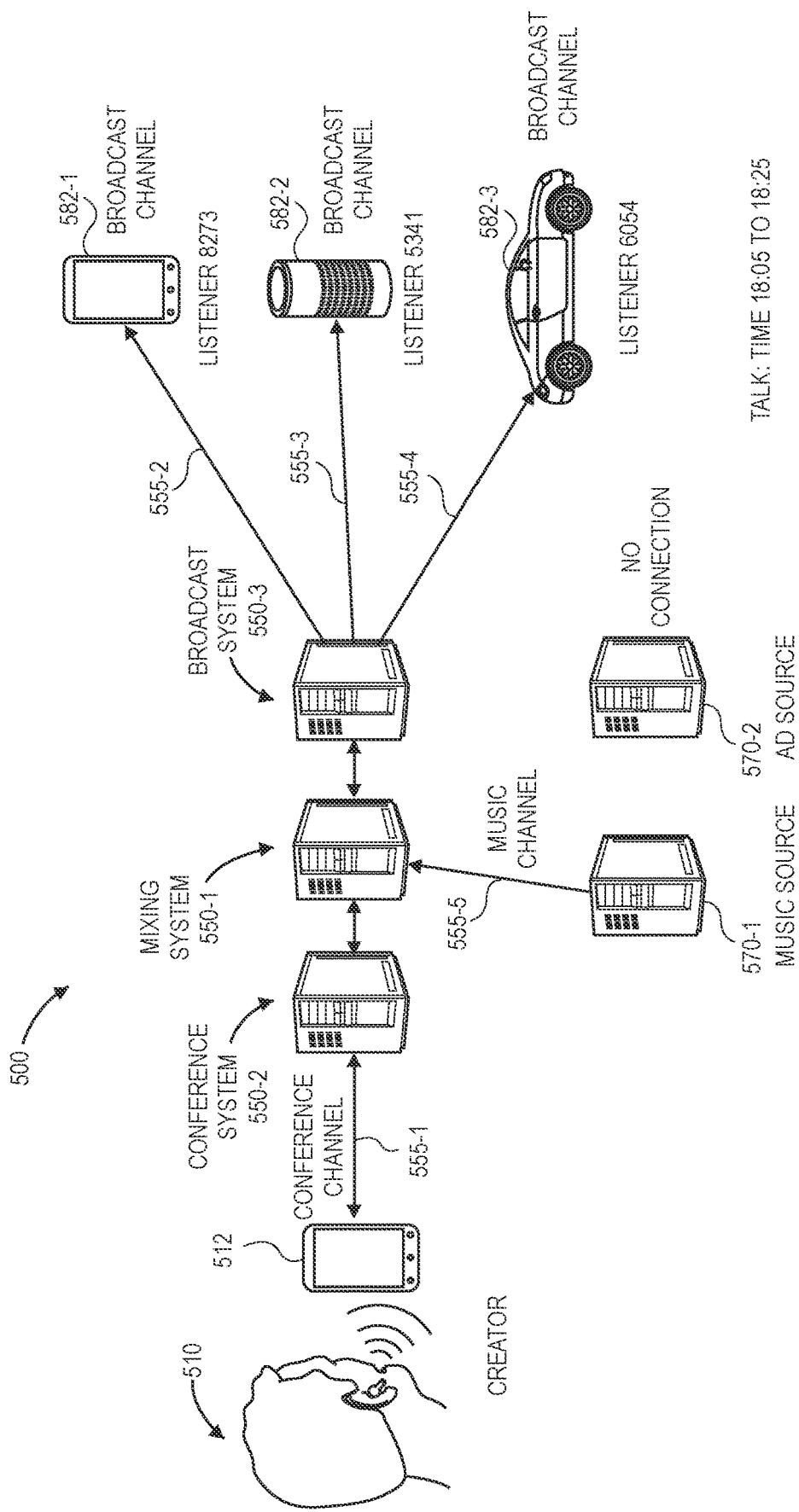

As is shown in FIG. 5C, after the first period is complete in accordance with the broadcast plan, or at the direction of the creator 510, the mixing system 550-1 establishes a music channel 555-5, e.g., a unidirectional communications channel, or a one-way communication channel, with the content source 570-1, e.g., a music source, for the second period of twenty minutes. The conference system 550-2 maintains the conference channel 555-1 with the mobile device 512 of the creator 510, while the broadcast system 550-3 maintains the broadcast channels 555-2, 555-3, 555-4 with the devices 582-1, 582-2, 582-3 of the listeners. The mixing system 550-1 then provides data for presenting the media program, including media content from the content source 570-1 and media content from the mobile deice 512 of the creator 510 by way of the conference system 550-2 to the broadcast system 550-3, which then transmits the data to the devices 582-1, 582-2, 582-3 of the listeners and to the mobile device 512 of the creator 510.

By establishing the music channel 555-5 with the content source 570-1, the mixing system 550-1 enables the devices 582-1, 582-2, 582-3 of the listeners to receive media content of the media program (e.g., music from the selected playlist) from the content source 570-1 over the network 590 by the broadcast system 550-3. Additionally, by maintaining the conference channel 555-1 with the mobile device 512, the conference system 550-2 enables the creator 510 to provide further commentary (e.g., words or sounds) during the playing of media content from the content source 570-1, and such commentary may be transmitted to the devices 582-1, 582-2, 582-3 of the listeners along with the media content from the content source 570-1, at the control or discretion of the creator 510.

Figure 5D:
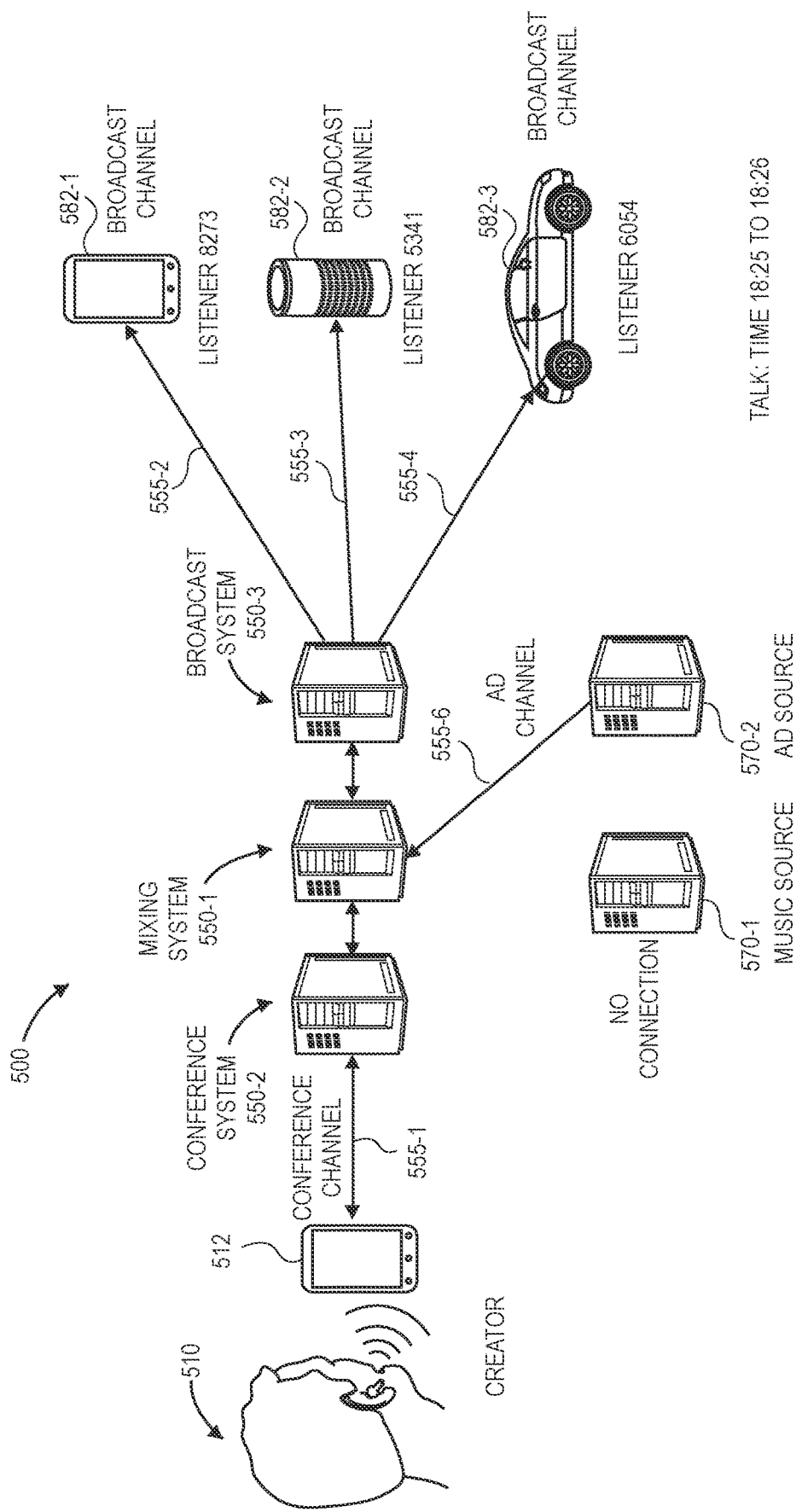

As is shown in FIG. 5D, after the second period is complete in accordance with the broadcast plan, or at the direction of the creator 510, the mixing system 550-1 terminates the music channel 555-5 with the content source 570-1, and establishes an advertisement channel 555-6, e.g., a unidirectional communications channel, or a one-way communication channel, with the content source 570-2, e.g., an advertisement source, for the third period of one minute. As is also shown in FIG. 5D, the broadcast system 550-3 maintains the broadcast channels 555-2, 555-3, 555-4 with the devices 582-1, 582-2, 582-3 of the listeners during the third period.

By establishing the advertisement channel 555-6 with the content source 570-2, the mixing system 550-1 enables the mobile device 512 and the devices 582-1, 582-2, 582-3 of the listeners to receive media content of the media program (e.g., a one-minute advertisement for an item, a good or a service) from the content source 570-2 over the network 590. In some implementations, the mixing system 550-1 may be configured to automatically establish that the advertisement from the content source 570-2 is at a higher level of priority over any other media content for a finite duration, such as by automatically elevating a volume or other attribute or parameter of the advertisement over any other media content, including but not limited to media content received from the creator 510.

In some implementations, the advertisement channel 555-6 may be established between the content source 570-2 and the broadcast system 550-3 directly. In some other implementations, the conference channel 555-1 may be terminated with the mobile device 512, and a broadcast channel may be established between the mobile device 512 and the broadcast system 550-3, thereby ensuring that only the advertisement from the content source 570-2 is presented to the devices 582-1, 582-2, 582-3 of the listeners during the third period, and inhibiting the creator 510 from providing any media content during this period. Moreover, in some implementations, the creator 510 may override the advertisement by one or more gestures or other interactions with the mobile device 512.

Figure 5E:
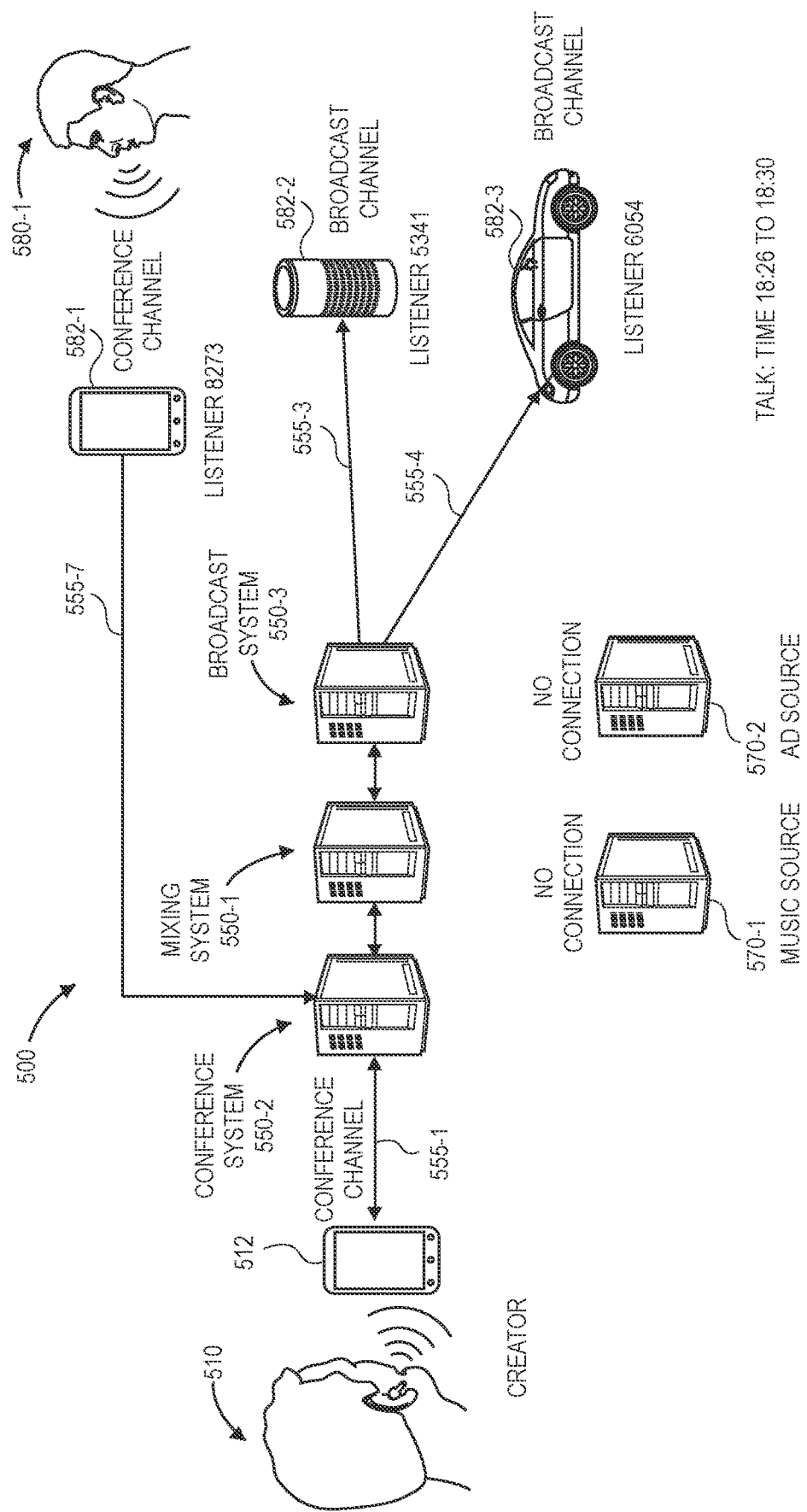

As is shown in FIG. 5E, after the third period is complete in accordance with the broadcast plan, or at the direction of the creator 510, the mixing system 550-1 terminates the advertisement channel 555-6 with the content source 570-2. The mixing system 550-1 also causes the broadcast channel 555-2 between the broadcast system 550-3 and the device 582-1 of the listener 580-1 to be terminated, and further causes the conference channel 555-2 to establish a conference channel 555-7 with the device 582-1 of the listener 580-1, for the fourth period of four minutes, while maintaining the broadcast channels 555-3, 555-4 with the devices 582-2, 582-3 of other listeners.

By terminating the broadcast channel 555-2 and establishing the conference channel 555-7, the mixing system 550-1 permits the listener 580-1 to not only receive media content but also provide media content in accordance with the broadcast plan, e.g., by way of the conference system 550-2. Thus, the creator 510 and the listener 580-1 may engage in a two-way conversation, with media content in the form of audio signals being captured by their respective devices and provided to the conference system 550-2, which then provides data representing the media content to the mixing system 550-1 for transmission to the broadcast system 550-3 and to each of the devices 582-2, 582-3 of the other listeners. Additionally, the mixing system 550-1 may automatically adjust a volume level or other attribute of the media content to be transmitted by the broadcast system 550-3 to the devices 582-2, 582-3 of the other listeners on an as-needed basis, or in response to one or more instructions received from the creator 510 by way of the mobile device 512. The media program may be deemed complete at an end time designated in accordance with the broadcast plan, or in response to one or more instructions from the creator 510, e.g., by one or more gestures or other interactions with the mobile device 512.

Figure 6A:
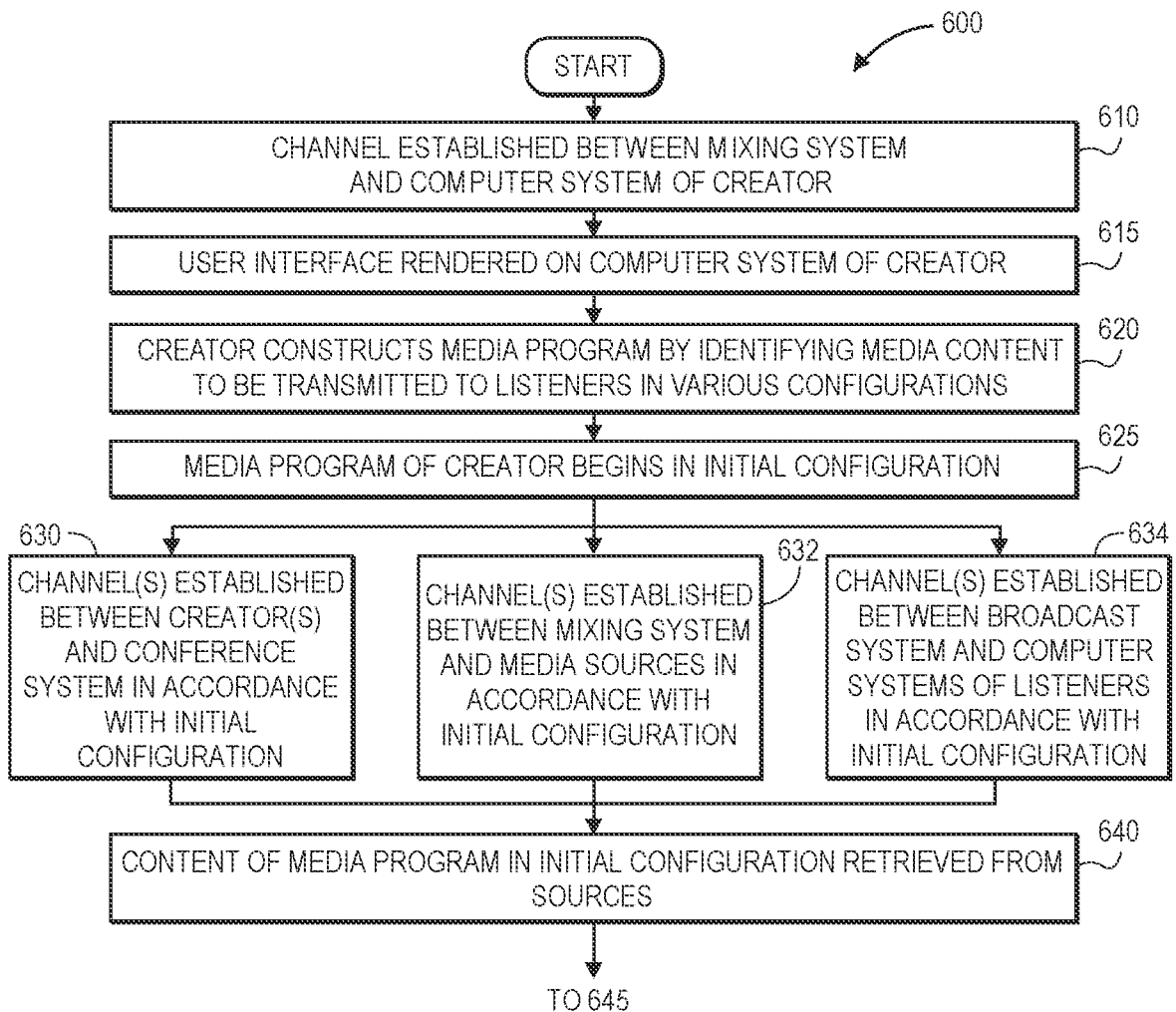
FIGS. 6A and 6B are a flow chart of one process for synchronizing media content streams in accordance with embodiments of the present disclosure.
Figure 6B:
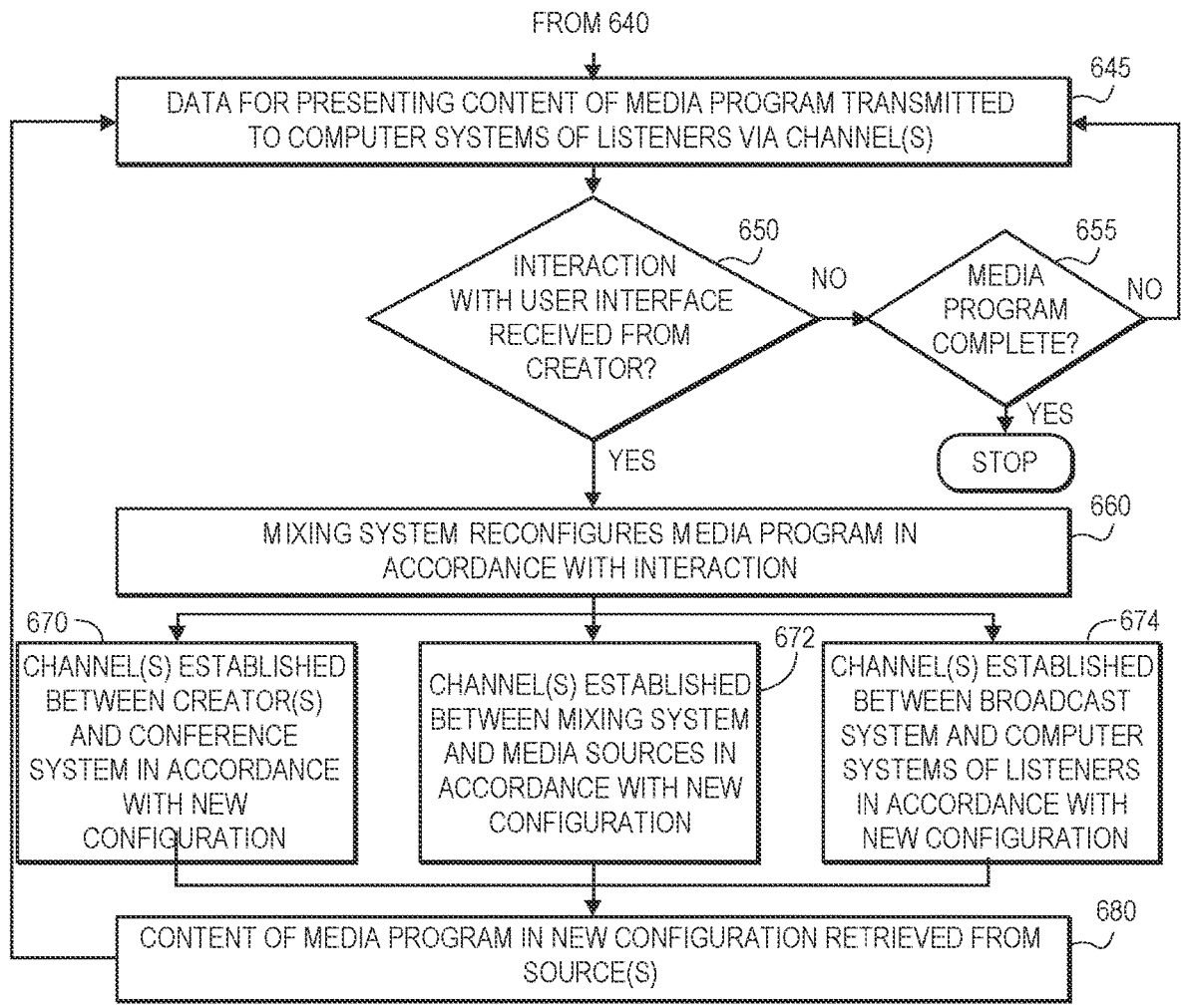

In accordance with implementations of the present disclosure, creators may construct a media program in accordance with a broadcast plan or sua sponte, e.g., as the media program is in progress. Media programs of the present disclosure may be constructed subject to the ultimate control of the creator, who may extend, shorten or modify a media program by one or more gestures or other interactions with a computer system or device. Referring to FIG. 6, a flow chart of one process 600 for synchronizing media content streams in accordance with embodiments of the present disclosure is shown.

At box 610, a channel is established between a mixing system and a computer system of a creator. In some implementations, the channel may be a two-way channel, e.g., a bidirectional channel or a conference channel, established by Web Socket or any other technique or protocol. The channel may enable the creator to provide one or more instructions to the creator for constructing a media program or for causing the media program to be transmitted to computer devices or systems of listeners. The mixing system may also be in direct communication with a conference system and a broadcast system, over one or more networks. At box 615, one or more user interfaces are rendered on the computer system of the creator. For example, in some implementations, the user interfaces may include one or more interactive or selectable elements or features that enable the creator to construct a broadcast plan for playing a media program, or to modify any number of attributes or parameters of the broadcast plan, such as by adding, removing or modifying media content designated within the broadcast plan, or by changing start times, end times or durations of the media program or any of the media content.

At box 620, the creator constructs a media program by identifying media content to be transmitted to listeners in various configurations. For example, the creator may designate or provide a start date or time (or time zone) for a media program, an end time or duration of the media program, a frequency by which the program is to be repeated, and a text-based description of the media program, or select one or more general or specific types of media content to be included in the media program at any given time. The media content designated by the creator may include but need not be limited to advertisements, music, news, sports, weather, or other programming. Alternatively, in some implementations, the media program may be constructed by or associated with multiple creators.

At box 625, a media program of the creator begins in an initial configuration. For example, the initial configuration may identify media content to be played from one or more sources at a predetermined time or on a predetermined date. At box 630, channels are established between the creator and the conference system in accordance with the initial configuration. For example, a two-way connection may be established between a device or system of the creator and the conference system, which is in communication with the mixing system. In some implementations, such as where the first media content to be transmitted to the listeners in the initial configuration includes words spoken or sung by, or music played by, a listener or another guest or participant, another two-way connection may be established between a device or system of that listener or the other guest or participant and the conference system. The mixing system may act as a virtual participant in a "conference" with the creator and any number of other devices or systems, and may both transmit data representing audio signals to and receive data representing audio signals from any of such devices or systems.

In parallel, at box 632, one or more channels are established between the mixing system and one or more media sources in accordance with the initial configuration. In some implementations, the one or more channels established between the mixing system and the one or more media sources may be one-way channels, e.g., unidirectional channels, or broadcast channels, for receiving data for playing media content from the media sources in the initial configuration. Alternatively, in some implementations, the one or more channels may be two-way channels, e.g., bidirectional channels, or conference channels, which may be established between any number of media sources for presenting media content to listeners in accordance with the initial configuration.

At box 634, one or more channels are established between the broadcast system and one or more computer systems of listeners in accordance with the initial configuration. For example, in some implementations, the one or more channels established between the broadcast system and the one or more computer systems of the listeners may be one-way channels, e.g., unidirectional channels, or broadcast channels, for transmitting data for playing media content received from the mixing system to the computer systems of the listeners in the initial configuration. Alternatively, in some implementations, where one or more of the listeners are also participants for playing media content in the initial configuration, or sources of the media content, a two-way channel, e.g., a bidirectional channel, or a conference channel, may be established between each of the one or more listeners and the conference system.

The channels between the broadcast system and the computer systems of the listeners may be established in any manner, such as automatically, e.g., based upon prior authorizations of the listeners, at or prior to the start time of the media program, or in response to a request by one or more listeners, either prior to a start time of the media program, or after the media program has already commenced.

At box 640, content of the media program in the initial configuration is retrieved from one or more sources. For example, where the initial configuration requires the playing of advertisements, music, news, sports, or weather, a file or other set of data for playing a selected one of the advertisements, a selected title of music, a selected news or sports story, or a report on weather in a selected location, the specific content to be played in the initial configuration may be identified by a file name or other identifier in a location associated with a source of the content. At box 645, data for presenting the content of the media program is transmitted to the computer systems of the listeners. For example, the data may be transmitted via the channels established at box 630, box 632 and box 634, e.g., from a source of the media content to the mixing system and then by the broadcast system to the computer systems of the listeners, or by the source of the designated media content directly to the computer systems of the listeners, and also to the computer system of the creator.

At box 650, whether an interaction with the user interface has been received from the creator, e.g., by the mixing system, is determined. For example, such interactions may include gestures or other contact with one or more buttons, text boxes, checkboxes, drop-down menus, list boxes, toggles, pickers, search fields, tags, sliders, icons, carousels, or any other interactive or selectable elements or features on the user interface. Alternatively, in some implementations, such interactions may include one or more voice commands, which may be captured and interpreted by any microphones or acoustic sensors provided on the computer system of the creator.

If an interaction with the user interface has not been received, then the process advances to box 655, where whether the media program is complete is determined. If the media program is complete, then the process ends. If the media program is not complete, however, then the process returns to box 645, where data for presenting content of the media program in the initial configuration is transmitted via the channels. For example, in the absence of any interaction or other actions by the creator, data for presenting content of the media program in the initial configuration may continue to be transmitted to each of the computer systems of the listeners, and to the computer system of the creator, until the content has ended.

If an interaction with the user interface was received by the media system at box 650, however, then the process advances to box 660, where the media system reconfigures the media program in accordance with the interaction. For example, the media system may identify media content to be presented to listeners in accordance with the broadcast plan at a next period, or to identify sources of the media content. In some implementations, the transmission of data for presenting the content of the media program may be terminated in accordance with a broadcast plan, and an interaction need not be received from the creator. For example, where an advertisement is scheduled to be aired at a given time, connections may be established for transmitting data for presenting the advertisement to the computer systems of the listeners at or prior to the given time.

At box 670, one or more channels are established between the creator and the conference system in accordance with the new configuration. In parallel, at box 672, one or more channels are established between the mixing system and one or more media sources in accordance with the new configuration. At box 674, one or more channels are established between the broadcast system and one or more computer systems of listeners in accordance with the new configuration. For example, one-way or two-way channels may be established or terminated, as necessary, to ensure that media content is received from the media sources in accordance with the new configuration.

At box 680, data for presenting content of the media program in the new configuration is retrieved from one or more sources. The process then returns to box 645, where the data for presenting the content of the media program is transmitted to the computer systems of the listeners, e.g., via the channels established at box 670, box 672 and box 674, e.g., from a source of the media content to the mixing system and then by the broadcast system to the computer systems of the listeners, or by the source of the designated media content directly to the computer systems of the listeners, and also to the computer system of the creator. The reconfiguration of the media program may be repeated for any number of iterations in accordance with a broadcast plan, or at the control or discretion of the creator, and for any duration.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media programs including audio files, the systems and methods disclosed herein are not so limited, and the media programs described herein may include any type or form of media content, including not only audio but also video, which may be transmitted to and played on any number of devices of any type or form.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 4 or 6A and 6B, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A mixing computer system comprising at least one data store and at least one computer processor,
    wherein the mixing computer system is connected to one or more networks,
    wherein the at least one data store has one or more sets of instructions stored thereon that, when executed by the at least one computer processor, cause the mixing computer system to perform a method comprising:
       receiving a first instruction from a computer system associated with a creator of a media program over the one or more networks, wherein the first instruction identifies at least first media content to be transmitted at a first time to each of a plurality of computer systems, and wherein the first media content is maintained in at least a first source;
       receiving a second instruction from the computer system associated with the creator over the one or more networks, wherein the second instruction identifies second media content to be transmitted at a second time to each of the plurality of computer systems;
       causing a two-directional communication channel to be established between a conference computer system and the computer system associated with the creator, wherein the conference computer system is connected to the mixing computer system;
       causing one-directional communication channels to be established between a broadcast computer system and each of the plurality of computer systems, wherein the broadcast computer system is connected to the mixing computer system;
       receiving first data representing at least the first media content from the first source;
       causing at least the first data to be transmitted by the broadcast system to each of the plurality of computer systems via the one-directional communication channels at approximately the first time; and
       causing at least the first media content to be played by at least some of the plurality of computer systems at approximately the first time.

2. The mixing computer system of claim 1, wherein the first media content comprises at least one of:
    an advertisement;
    music;
    a news program;
    a sports program; or
    a weather report, and
    wherein receiving the first data representing at least the first media content from the first source further comprises:
       identifying a computer system associated with the first source of the first media content, wherein at least a portion of the first media content is stored on the computer system associated with the first source; and
       establishing a one-way communication channel between the mixing computer system and the computer system associated with the first source of the first media content, and
    wherein causing at least the first data to be transmitted by the broadcast system to each of the plurality of computer systems comprises:
       upon receiving the first data,
          transmitting at least the first data to the broadcast system.

3. The mixing computer system of claim 2, wherein the method further comprises:
    prior to the first time,
       causing a display of at least a first user interface on a display of the computer system associated with the creator, wherein at least one of the first instruction or the second instruction is received following at least a first interaction with the first user interface; and
    at approximately the first time,
       causing a display of at least a second user interface on the display of the computer system associated with the creator;
       receiving a third instruction from the computer system associated with the creator over the one or more networks, wherein the third instruction is received following at least a second interaction with the second user interface; and
    in response to the third instruction,
       selecting a volume level of one of the first media content or second media content based at least in part on the third instruction.

4. The mixing computer system of claim 1, wherein the first instruction further identifies third media content to be transmitted to each of the plurality of computer systems at approximately the first time, and
    wherein the method further comprises:
       identifying a third computer system associated with a source of the third media content, wherein at least a portion of the third media content is stored on the third computer system;
       establishing a second communication channel between the third computer system and the first computer system, wherein the second communication channel is one-directional from the third computer system to the first computer system; and
       receiving second data representing at least the third media content from the third computer system via the second communication channel, and
    wherein transmitting at least the first data to each of the plurality of computer systems via the plurality of communication channels at approximately the first time comprises:
       transmitting the first data and the second data to each of the plurality of computer systems via the plurality of communication channels at approximately the first time.

5. A computer-implemented method comprising:
    receiving, by a first computer system from a second computer system, a first instruction identifying at least first media content to be transmitted to one or more computer devices at a first time or for a first duration in accordance with a media program, wherein the first instruction is provided to the second computer system by at least one computer device associated with a creator of the media program, wherein the at least one computer device associated with the creator is connected to the second computer system by a two-way communication channel, and wherein each of the plurality of computer devices is associated with at least one listener to the media program;

receiving, by the first computer system from the second computer system, a second instruction identifying at least second media content to be transmitted to the one or more computer systems at a second time or for a second duration in accordance with the media program, wherein the second instruction is provided to the second computer system by the at least one computer device associated with the creator of the media program;

establishing, by the first computer system, a plurality of communication channels, wherein each of the plurality of communication channels is a one-way communication channel extending from a third computer system to one of the plurality of computer devices, and wherein the third computer system is connected to the first computer system;

identifying, by the first computer system, a source of at least the first media content based at least in part on the first instruction;

establishing, by the first computer system, a one-way communication channel extending from a computer device associated with the source of the first media content to the first computer system;

receiving, by the first computer system, data representing the first media content from the computer device associated with the source of the first media content;

causing, by the first computer system, at least some of the data representing the first media content to be transmitted by the third computer system to each of the plurality of computer devices; and causing, by the first computer system, at least the first media content to be played by each of the plurality of computer devices at approximately the first time or for approximately the first duration in accordance with the media program.

6. The computer-implemented method of claim 5, further comprising:

receiving, by the first computer system from the second computer system, data representing third media content, wherein the data representing the third media content is provided to the second computer system by the at least one computer device associated with the creator of the media program, and wherein the third media content comprises at least one word spoken or sung by the creator, wherein causing the data representing the first media content to be transmitted by the third computer system to each of the plurality of computer devices further comprises:

causing, by the first computer system, at least the data representing the third media content to be transmitted by the third computer system to each of the plurality of computer devices at a second time, and wherein the computer-implemented method further comprises:

causing, by the first computer system, the third media content to be played by each of the plurality of computer devices in accordance with the media program at approximately the second time.

7. The computer-implemented method of claim 6, further comprising:

automatically selecting, by the first computer system, a first volume for at least a portion of the first media content based at least in part on at least one attribute of the first media content; and automatically selecting, by the first computer system, a second volume for at least a portion of the third media content based at least in part on at least one attribute of the third media content, wherein the first media content is caused to be played by each of the plurality of computer devices at the first volume, and wherein the third media content is caused to be played by each of the plurality of computer devices at the second volume.

8. The computer-implemented method of claim 5, further comprising:

identifying, by the first computer system, a source of the second media content based at least in part on the second instruction;

establishing, by the first computer system, a one-way communication channel from a computer device associated with the source of the second media content to the first computer system;

receiving, by the first computer system, data representing at least the second media content from the computer device associated with the source of the second media content;

causing, by the first computer system, at least some of the data representing at least the second media content to be transmitted by the third computer system to each of the plurality of computer devices at the second time or for at least a portion of the second duration; and causing, by the first computer system, at least the first media content to be played by each of the plurality of computer devices at approximately the first time or for approximately the first duration in accordance with the media program.

9. The computer-implemented method of claim 5, wherein the computer device associated with the creator is a mobile device comprising:

at least one microphone;
an interactive display; and
at least one speaker, wherein the first instruction is received following at least a first interaction by the creator with the interactive display, and wherein the second instruction is received following at least a second interaction by the creator with the interactive display.

10. The computer-implemented method of claim 9, further comprising:

causing, by the first computer system, a display of a user interface on the interactive display, wherein the user interface comprises:

a first element for selecting one of a plurality of types of media content; and a second element for selecting at least one of a time at which media content is to be played or a duration of the media content, and wherein the first interaction is a selection of at least one of:

the first media content by the first element; or
the first time or the first duration by the second element.

11. The computer-implemented method of claim 9, further comprising:

causing, by the first computer system, a display of a user interface on the interactive display, wherein the user interface comprises:
  at least one element for setting a volume of the first media content; and
receiving, by the first computer system, at least a third interaction with the interactive display, wherein the third interaction is one of a selection or an adjustment of the volume of the first media content by the at least one element.

12. The computer-implemented method of claim 9, further comprising:
causing, by the first computer system, a display of a user interface on the interactive display, wherein the user interface comprises:
  a first element for causing at least one of the first media content or the second media content to be played by each of the plurality of computer devices; and
  a second element for stopping the at least one of the first media content or the second media content,
wherein at least some of the data representing the first media content is transmitted by the third computer system to each of the plurality of computer devices in response to a third interaction by the creator with the interactive display, and
wherein the third interaction is an activation of the first element.

13. The computer-implemented method of claim 5, wherein the first instruction identifies at least the first media content and third media content to be transmitted to the one or more computer devices at the first time or for at least a portion of the first duration in accordance with the media program, and
wherein the computer-implemented method further comprises:
  identifying, by the first computer system, a source of at least the third media content;
  establishing, by the first computer system, a one-way communication channel extending from a computer device associated with the source of the third media content to the first computer system; and
  receiving, by the first computer system, data representing the third media content from the computer device associated with the source of the third media content,
wherein causing the at least some of the data representing the first media content to be transmitted by the third computer system to each of the plurality of computer devices comprises:
  causing, by the first computer system, at least some of the data representing the first media content and at least some of the data representing the third media content to be transmitted by the third computer system to each of the plurality of computer devices, and
wherein causing at least the first media content to be played by each of the plurality of computer devices at approximately the first time or for approximately the first duration in accordance with the media program comprises:
  causing, by the first computer system, at least the first media content and the third media content to be played by each of the plurality of computer devices in accordance with the media program.

14. The computer-implemented method of claim 5, wherein the at least one computer device associated with the creator is connected to the second computer system by a two-way communication channel established according to a Web Socket protocol.

15. The computer-implemented method of claim 5, further comprising:
determining, by the first computer system based at least in part on the second instruction, that a source of the second media content is one of a first listener, or a first computer device of the plurality of computer devices associated with the first listener, and
wherein the computer implemented method further comprises:
  terminating, by the first computer system, one of the plurality of communication channels with the first computer device of the first listener;
  establishing, by the first computer system, a two-way communication channel between the first computer device of the first listener and the second computer system; and
  receiving, by the first computer system from the second computer system, data representing at least the second media content, wherein the second media content comprises at least one word spoken by the first listener and captured by the first computer device,
wherein causing the at least some of the data representing the first media content to be transmitted by the third computer system to each of the plurality of computer devices comprises:
  causing, by the first computer system, at least some of the data representing the first media content and at least some of the data representing the second media content to be transmitted by the third computer system to each of the plurality of computer devices, and
wherein causing at least the first media content to be played by each of the plurality of computer devices at approximately the first time or for approximately the first duration in accordance with the media program comprises:
  causing, by the first computer system, at least the first media content and the second media content to be played by each of the plurality of computer devices in accordance with the media program.

16. The computer-implemented method of claim 5, wherein the first media content comprises at least one of:
an advertisement;
music;
a news program;
a sports program; or
a weather report.

17. The computer-implemented method of claim 5, wherein each of the plurality of computer devices is at least a portion of one of:
an automobile;
a desktop computer;
a laptop computer;
a media player;
a smartphone;
a smart speaker;
a tablet computer;
a television; or
a wristwatch.

18. A mobile device comprising:
an interactive display;
at least one microphone;
at least one processor;
at least one speaker; and at least one transceiver, wherein the mobile device is programmed with one or more sets of instructions that, when executed by the at least one processor, cause the mobile device to at least:

cause a display of at least a first user interface on the interactive display, wherein the first user interface comprises:
- at least a first element for selecting one of a plurality of types of media content; and
- at least a second element for selecting at least one of a time at which media content is to be played or a duration for which the one of the plurality of types of media content is to be played;

receive a first interaction with the first element, wherein the first interaction is a selection of a first type of media content, and wherein the first type of media content comprises spoken words;

receive a second interaction with the second element, wherein the second interaction is a selection of at least one of a first time at which the first type of media content is to be played or a first duration for which the first type of media content is to be played;

transmit information regarding the first type of media content and the at least one of the first time or the first duration to a control system over at least one network;

establish a bidirectional channel with the control system over the at least one network;

cause a display of at least a second user interface on the interactive display, wherein the second user interface comprises:
- at least a third element for causing a playing of at least the first type of media content;

receive a third interaction with the third element, wherein the third interaction is an instruction to play at least the first type of media content; and in response to the third interaction,
- capture, by the at least one microphone, first media content of the first type; and
- transmit data for playing at least the first media content to the control system at the first time or for the first duration, wherein the control system is configured to transmit at least the first media content to a plurality of computer devices over one-directional channels at approximately the first time or for approximately the first duration.

19. The mobile device of claim 18, wherein the one or more sets of instructions, when executed by the at least one processor, further cause the mobile device to at least:

receive a fourth interaction with at least the first element, wherein the fourth interaction is a selection of a second type of media content; and transmit data for playing at least the second type of media content to the broadcast control system at approximately the first time or for at least a portion of the first duration, wherein the second type of media content is at least one of:
- an advertisement;
- music;
- a news program;
- a sports program; or
- a weather report.

20. The mobile device of claim 19, wherein the one or more sets of instructions, when executed by the at least one processor, further cause the mobile device to at least:

cause a display of at least a third user interface on the interactive display, wherein the third user interface comprises:
- at least a fourth element for setting a volume of at least the first type of media content; and
- at least a fifth element for setting a volume of at least the second type of media content; and receive at least a fifth interaction with one of the fourth element or the fifth element, wherein a volume of one of the first type of media content or the second type of media content is selected or adjusted in response to the fifth interaction.

\* \* \* \* \*